(12) United States Patent
Hiranandani et al.

(10) Patent No.: US 10,726,629 B2
(45) Date of Patent: *Jul. 28, 2020

(54) IDENTIFYING AUGMENTED REALITY VISUALS INFLUENCING USER BEHAVIOR IN VIRTUAL-COMMERCE ENVIRONMENTS

(71) Applicant: Adobe Inc., San Jose, CA (US)

(72) Inventors: Gaurush Hiranandani, Karnataka (IN); Chinnaobireddy Varsha, Telangana (IN); Sai Varun Reddy Maram, Telangana (IN); Kumar Ayush, Jharkhand (IN); Atanu Ranjan Sinha, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/189,638

(22) Filed: Nov. 13, 2018

(65) Prior Publication Data

US 2019/0102952 A1 Apr. 4, 2019

Related U.S. Application Data

(63) Continuation of application No. 15/433,834, filed on Feb. 15, 2017, now Pat. No. 10,163,269.

(51) Int. Cl.
*G09G 5/00* (2006.01)
*G06T 19/00* (2011.01)
(Continued)

(52) U.S. Cl.
CPC ........... *G06T 19/006* (2013.01); *G06Q 10/00* (2013.01); *G06Q 10/06* (2013.01); *G06Q 30/0641* (2013.01)

(58) Field of Classification Search
None
See application file for complete search history.

(56) References Cited

U.S. PATENT DOCUMENTS 9,371,007 B1 6/2016 Penilla
9,811,352 B1 * 11/2017 Sharifi .................. G06F 16/156
(Continued)

OTHER PUBLICATIONS

Notice of Allowance from related U.S. Appl. No. 15/433,834 dated Aug. 15, 2018, 16 pages.
(Continued)

*Primary Examiner* — Anh-Tuan V Nguyen
(74) *Attorney, Agent, or Firm* — Kilpatrick Townsend & Stockton LLP

(57) ABSTRACT

Certain embodiments involve enhancing personalization of a virtual-commerce environment by identifying an augmented-reality visual of the virtual-commerce environment. For example, a system obtains a data set that indicates a plurality of augmented-reality visuals generated in a virtual-commerce environment and provided for view by a user. The system obtains data indicating a triggering user input that corresponds to a predetermined user input provideable by the user as the user views an augmented-reality visual of the plurality of augmented-reality visuals. The system obtains data indicating a user input provided by the user. The system compares the user input to the triggering user input to determine a correspondence (e.g., a similarity) between the user input and the triggering user input. The system identifies a particular augmented-reality visual of the plurality of augmented-reality visuals that is viewed by the user based on the correspondence and stores the identified augmented-reality visual.

20 Claims, 6 Drawing Sheets

(51) Int. Cl.
G06Q 10/00 (2012.01)
G06Q 30/06 (2012.01)
G06Q 10/06 (2012.01)

(56) References Cited

U.S. PATENT DOCUMENTS

| | | | |
|---|---|---|---|
| 2007/0130090 A1 | 6/2007 | Staib et al. | |
| 2008/0071559 A1* | 3/2008 | Arrasvuori | G06Q 30/06 705/26.1 |
| 2008/0255935 A1* | 10/2008 | Madhavan | G06Q 30/02 705/14.64 |
| 2008/0306817 A1* | 12/2008 | Amidon | G06Q 30/02 705/14.61 |
| 2009/0076894 A1* | 3/2009 | Bates | G06Q 30/02 705/14.61 |
| 2009/0091565 A1* | 4/2009 | Booth | G06Q 30/02 345/419 |
| 2009/0091571 A1* | 4/2009 | Zalewski | G06Q 30/02 345/427 |
| 2009/0271289 A1 | 10/2009 | Klinger | |
| 2010/0088152 A1 | 4/2010 | Bennett | |
| 2010/0164956 A1* | 7/2010 | Hyndman | G06F 3/011 345/427 |
| 2010/0205035 A1* | 8/2010 | Baszucki | G06Q 20/102 705/14.12 |
| 2010/0250335 A1 | 9/2010 | Cetin et al. | |
| 2011/0035272 A1 | 2/2011 | Bhatt | |
| 2011/0196739 A1* | 8/2011 | Zhang | G06Q 30/02 705/14.52 |
| 2013/0293530 A1* | 11/2013 | Perez | G06K 9/00671 345/418 |
| 2013/0317950 A1 | 11/2013 | Abraham et al. | |
| 2014/0129325 A1* | 5/2014 | Zinger | G06Q 30/0241 705/14.46 |
| 2014/0321698 A1* | 10/2014 | Chao | G06T 7/20 382/103 |
| 2014/0337177 A1 | 11/2014 | Pitts et al. | |
| 2015/0012354 A1 | 1/2015 | Pedersen | |
| 2015/0026012 A1* | 1/2015 | Gura | G06Q 30/0643 705/26.62 |
| 2015/0073924 A1 | 3/2015 | Wickramasuriya et al. | |
| 2015/0205450 A1 | 7/2015 | Howett | |
| 2015/0206343 A1* | 7/2015 | Mattila | G06T 17/05 345/420 |
| 2015/0220814 A1* | 8/2015 | Verkasalo | G06Q 20/322 382/103 |
| 2015/0227971 A1 | 8/2015 | Vohra | |
| 2016/0042401 A1* | 2/2016 | Menendez | G06Q 30/0244 705/14.43 |
| 2016/0127654 A1* | 5/2016 | Kraft | G06T 19/006 348/239 |
| 2016/0156848 A1* | 6/2016 | Jen | H04N 5/23222 348/208.2 |
| 2016/0225053 A1 | 8/2016 | Romley et al. | |
| 2016/0344927 A1 | 11/2016 | Brasket | |
| 2017/0091077 A1* | 3/2017 | Manion | G06F 8/65 |
| 2017/0132842 A1* | 5/2017 | Morrison | G06T 19/006 |
| 2017/0178007 A1 | 6/2017 | Yu et al. | |
| 2017/0372267 A1 | 12/2017 | Soffer | |
| 2018/0005127 A1 | 1/2018 | Akyamac et al. | |
| 2018/0039691 A1 | 2/2018 | Hazra et al. | |
| 2018/0039946 A1 | 2/2018 | Bolte | |
| 2018/0181997 A1* | 6/2018 | Sanjeevaiah Krishnaiah | G06Q 30/0269 |
| 2018/0188938 A1* | 7/2018 | Deselaers | G06F 3/04883 |

OTHER PUBLICATIONS

Ad Age "Ad Age", Advertising & Marketing Industry News, https://adage.com/article/diditlinext/virtual-reality-frontier-retail/3000061, 2014, accessed Sep. 4, 2019, 13 pages.

Gortz, "Goertz Casefilm Virtual Shoe Fitting", You Tube, https://www.youtube.com/watch?v=uSn7cluwl_A, Jun. 1, 2012, accessed Nov. 13, 2019, 26 pages.

Luxottica Group, "Ray-Ban Virtual-Mirror", 2019, http://www.ray-ban.com/india/virtual-mirror , accessed Nov. 12, 2019, 3 pages.

Wagner, Daniel, et al., Real-Time Detection and Tracking for Augmented Reality on Mobile Phones, IEEE Transactions on Visualization and Computer Graphics, vol. 16 , Issue: 3 , May-Jun. 2010, 14 pages.

Rack, Christian, et al., "A Generic Multipurpose Reconmtender System for Contextual Recommendations", IEEE Xplore, Eighth International Symposium on Autonomous Decentralized Systems, Apr. 2, 2007, 6 pages.

Cox, D. R., et al, "Analysis of Survival Data", Chapman and Hall, London—New York 1984, 3 pages.

Charlesworth, Alan, "Key Concepts in E-Commerce", Palgrave Macmillian 2007, 4 pages.

Reliawiki, "The Generalized Gamma Distribution", http://reliawiki.org/index.php/The_Generalized_Gamma_Distribution, Aug. 2011-Jul. 2017, 7 pages.

\* cited by examiner

US 10,726,629 B2

IDENTIFYING AUGMENTED REALITY VISUALS INFLUENCING USER BEHAVIOR IN VIRTUAL-COMMERCE ENVIRONMENTS

CROSS-REFERENCE TO RELATED APPLICATION

This application is a continuation application of and claims priority to U.S. patent application Ser. No. 15/433,834, filed on Feb. 15, 2017, the contents of which are incorporated herein by reference in their entirety.

TECHNICAL FIELD

This disclosure generally relates to virtual commerce and more specifically relates to identifying or determining one or more augmented reality visuals that influence user behavior in virtual commerce environments to personalize the virtual commerce environment to a user (e.g., via recommendations of various actions).

BACKGROUND

Augmented reality ("AR") devices provide an augmented reality environment in which physical objects or "real world" objects are concurrently displayed with virtual objects in a virtual space. To provide the AR environment, some AR devices recognize one or more physical objects in a physical space using various image recognition methods and techniques. For example, AR devices capture images of the physical objects or the physical space and transmit the images of the physical objects or physical space to a server that performs the image recognition operations. The AR device generates and displays an AR environment that includes the recognized physical objects and the physical space. The AR device then generates one or more virtual objects and supplements or augments the physical object and physical space with the virtual objects by displaying the virtual objects, along with the physical objects. Other AR devices provide the AR environment by recognizing specific codes disposed on a physical object and displaying one or more virtual objects, along with the physical object "augmented" with the virtual object. A user of the AR device views the AR environment and provides user input to interact with, or manipulate, the virtual object or the physical object in the AR environment. As the AR device generates and provides the AR environment and as the user interacts with the AR environment, the AR device generates and provides various AR visuals (e.g., images or frames) to the user.

In virtual commerce ("v-commerce") systems, an AR device provides an AR or v-commerce environment in which virtual objects correspond to "real world" physical objects that are available for sale and the virtual objects are used to "augment" a physical space or a physical object. The v-commerce system allows users to interact with the virtual objects, the physical objects, and the physical space as the user engages in commerce (e.g., as the user decides whether to purchase a real world physical object that corresponds to a virtual object).

Existing v-commerce systems and applications have limitations as they do not capture or track data indicating the various AR visuals generated and provided to a user in an AR or v-commerce environment and data indicating user behavior with regard to each AR visual. Thus, some existing v-commerce systems and applications do not identify AR visuals that influence or impact user behavior, which are useful and beneficial to enhance the v-commerce experience.

SUMMARY

Various embodiments of the present disclosure provide systems and methods for determining a correlation between augmented reality visuals (e.g., images or frames) and user behavior in a virtual-commerce environment. For example, various embodiments of the present disclosure provide systems and methods for determining augmented reality visuals that cause, or influence, user behavior in virtual-commerce environments, which can be used to improve personalization of an augmented reality environments for users.

In one example, a method for enhancing personalization of a virtual-commerce environment by identifying an augmented reality visual of the virtual-commerce environment includes obtaining, by a processor, data indicating a plurality of augmented-reality visuals generated in a virtual-commerce environment and provided for view by a user. The method further includes obtaining, by the processor, data indicating a triggering user input. The triggering user input indicates a predetermined user input provideable by the user as the user views an augmented-reality visual of the plurality of augmented-reality visuals and detectable by the processor. The method further includes obtaining, by the processor, data indicating a user input provided by a user. The method further includes determining, by the processor, a correspondence between the user input and the triggering user input based on a comparison of the data indicating the user input and the data indicating the triggering user input. The correspondence indicates a similarity between the triggering user input and the user input. The method further includes identifying, by the processor, a particular augmented-reality visual of the plurality of augmented-reality visuals that is viewed by the user based on the correspondence and storing the identified augmented-reality visual.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
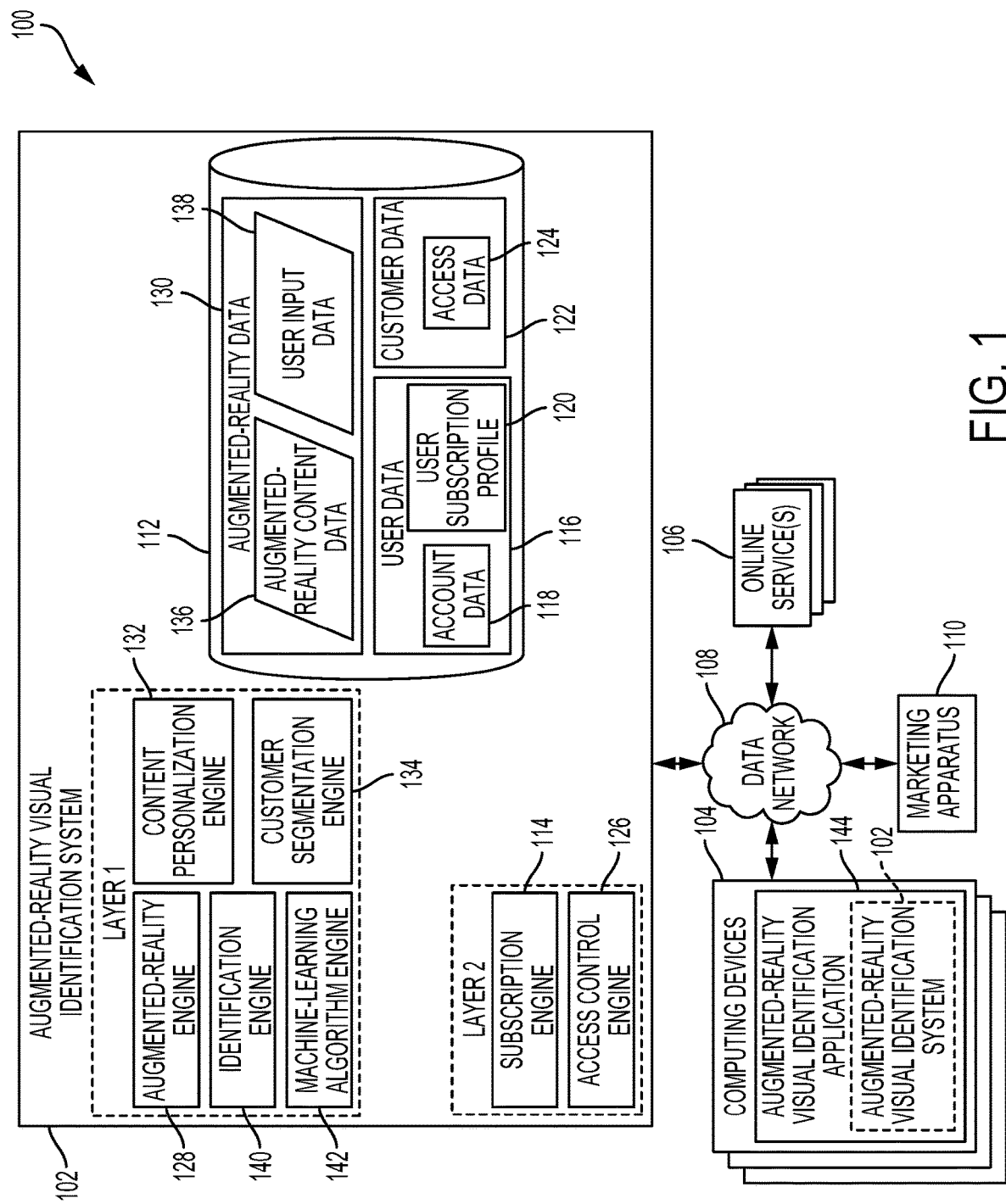
FIG. 1 is an example of a computing environment in which an augmented-reality visual identification system identifies an augmented-reality visual that influences user behavior in a virtual commerce environment, according to certain embodiments.

Various embodiments of the present disclosure involve determining a correlation or relationship between augmented-reality ("AR") visuals (e.g., images or frames) provided to a user in a virtual commerce ("v-commerce") environment and user behavior in the v-commerce environment by analyzing the AR visuals and user input in the v-commerce environment. For example, various embodiments of the present disclosure involve detecting or identifying one or more AR visuals that cause, or influence, a particular user behavior in a v-commerce environment. As described above, some existing v-commerce systems do not capture or track data indicating the various AR visuals generated and provided to the user in an AR or v-commerce environment. Moreover, some existing v-commerce applications do not account for an effect that a particular AR visual has on a user's behavior in the v-commerce environment or may not account for user behavior before or after viewing a particular AR visual. Certain embodiments address these issues by identifying or detecting one or more AR visuals that influence a user's behavior in a v-commerce environment (e.g., influence the user's decision to make a purchase) based on data indicating various AR visuals provided to the user in the v-commerce environment, which improves the recommendation of various actions to the user. For example, in some embodiments, identifying AR visuals that influence user behavior in v-commerce environments provides users with content with which the user is more likely to engage (e.g., by increasing a likelihood of a user interacting with a virtual object or making a purchase by providing or recommending visuals that are likely to influence user behavior).

In one example, an AR device simulates a v-commerce environment by recognizing a physical object in a physical space and displaying an AR environment that includes the recognized physical object and the physical space. The AR device supplements or augments the physical object or space by generating a virtual object and concurrently displaying the virtual object, along with the physical object or space in the AR environment. As an example, if the virtual object is a virtual chair, the virtual chair is used to supplement or augment a physical room in the AR environment. In the v-commerce environment, a virtual object in the AR environment corresponds to a real world physical object that may be available for sale. In this example, the AR device detects user input provided by the user as the user interacts with the v-commerce environment, such as, for example, a user input indicating a change in location or orientation of a virtual object in the v-commerce environment, user input indicating a request for information about a real world physical object represented by a virtual object in the v-commerce environment (e.g., to request information about a price or availability of the real world physical object), or user input to purchase the real world physical object. The AR device also analyzes and stores the detected user input. In this example, the AR device generates and outputs one or more AR visuals that include, for example, one or more of the physical space, the physical object, and the virtual objects, in response to the detected user input.

An AR visual identification system, which includes one or more computing devices, obtains data about the v-commerce environment. The data indicates various AR visuals generated and provided to the user in the v-commerce environment. The data also includes data indicating one or more triggering user inputs. A triggering user input includes, for example, a predetermined or a particular user input that may be provided by the user while viewing, or interacting with, the v-commerce environment. As an illustrative example, the data indicates that a triggering user input is any user input indicating a request for information about a real world physical object represented by a virtual object in the v-commerce environment. As another example, the data indicates that a triggering user input is any user input provided by the user to purchase the real world physical object represented by the virtual object. The AR visual identification system also obtains data indicating one or more user inputs provided by the user of the AR device. In some embodiments, the AR visual identification system detects the various user inputs provided by the user of the AR device. The AR visual identification system then determines or identifies one or more AR visuals of the various AR visuals based on the data received. For example, the AR visual identification system analyzes the data indicating user input and data indicating a triggering user input and identifies an AR visual if the user provides user input that corresponds to the triggering user input (e.g., provides user input that is similar to the triggering user input). As an illustrative example, the AR visual identification system detects user input and determines that the user input corresponds to the triggering user input and identifies one or more AR visuals viewed by the user at or near a time that the user provides the user input corresponding to the triggering user input. For example, the AR visual identification system identifies the AR image viewed by the user as the user provides user input requesting information about a real world physical object represented by a virtual object in the v-commerce environment.

In some embodiments, the identified AR visual is the AR visual viewed by the user that affects the user's behavior in the v-commerce environment. For example, the identified AR visual is the AR visual that influenced the user, or caused the user, to provide the triggering user input (e.g., to provide user input requesting information about the real world physical object represented by the virtual object or to purchase the real world physical object). Thus, in some embodiments, the AR visual identification system stores data indicating the identified AR visual and the identified AR visual is used to improve recommendation of various actions to the user (e.g., to recommend, to the user, various additional virtual objects representing real world physical objects available for sale based on the physical space, the physical objects, or the virtual objects in the identified AR visual).

In some embodiments, the AR visual identification system identifies an AR visual that influences user behavior in a v-commerce environment regardless of whether the user provides user input that corresponds to a triggering user input. For example, the user may not provide user input as the user views the v-commerce environment, or the user may not provide user input that corresponds to a triggering user input. In these embodiments, the AR visual identification system selects an AR visual of various AR visuals provided to the user based on an epoch time (e.g., a particular or calculated time) after the user begins to view the v-commerce environment by selecting the AR visual viewed by the user at, or near, the epoch time. For example, the AR visual selects an AR visual that is provided to the user at the epoch time. In some examples, the epoch time corresponds to a time after the user begins to view the v-commerce environment at which the user is likely to provide a user input that corresponds to a predefined triggering user input. For example, the AR visual identification system obtains data indicating a time stamp corresponding to a time that each of the various AR visuals is provided to the user. The AR visual identification system determines or calculates the epoch time or receives data indicating the epoch time. The AR visual identification system then determines or identifies an AR visual that is provided to the user or viewed by the user at or near the epoch time. As an example, the identified AR visual is the AR visual viewed by the user at the epoch time or immediately before the epoch time. In certain embodiments, the AR visual identification system trains a machine-learning algorithm to calculate or predict the epoch time using various methods and techniques. For example, the AR visual identification system trains the machine-learning algorithm to predict the epoch time based on data indicating various users' interaction with one or more v-commerce environments generated by the AR device. As an example, the AR visual identification system trains the machine-learning algorithm to determine a probability distribution of a particular epoch time (e.g., a probability distribution of a user providing user input corresponding to a triggering user input at or near a particular epoch time). The AR visual identification system then uses the determined probability distribution to predict the epoch time. For example, based on the probability distribution, the machine learning algorithm predicts a particular epoch time after a user begins to view a v-commerce environment at which the user is likely to provide user input that corresponds to a triggering user input. In this example, the AR visual identification system trains the machine-learning algorithm to predict or calculate the epoch time and identifies an AR visual among a plurality of AR visuals based on the epoch time as described above.

In some examples, a user accesses the AR visual identification system described above via an online service. For example, the online service includes one or more computing systems configured by program code to implement the operations describe above (e.g., implement the operations performed by the AR visual identification system) and the user accesses the online service using a client device (e.g., a mobile telephone) via a data network.

As used herein, the term "augmented reality device" is used to refer to any device configured to generate or display an augmented reality environment, simulate an augmented reality environment, or generate an augmented reality visual.

As used herein, the term "augmented reality" or "augmented reality environment" is used to refer to an environment in which physical objects in a physical space are concurrently displayed with virtual objects in a virtual space.

As used herein, the term "virtual commerce," "v-commerce," or "virtual commerce environment" is used to refer to an augmented reality environment in which one or more virtual objects in the augmented reality environment represent real world physical objects that may be available for purchase by a consumer.

As used herein, the term "augmented reality visual" or "augmented reality image" is used to refer to any image, frame, or content generated or provided to a user as part of an augmented reality environment or as part of a virtual commerce environment.

As used herein, the term "epoch time" is used to refer to a particular or predetermined time during which an augmented reality visual or an augmented reality image is provided to a user of an augmented reality device or viewed by the user.

As used herein, the term "online service" is used to refer to one or more computing resources, including computing systems that may be configured for distributed processing operations, that provide one or more applications accessible via a data network. The collection of computing resources may be represented as a single service. In some embodiments, an online service provides a digital hub for browsing, creating, sharing, and otherwise using electronic content using one or more applications provided via the online service.

FIG. 1 is an example of a computing environment 100 in which an augmented-reality ("AR") visual identification system 102 identifies an AR visual that influences user behavior in a virtual commerce environment, according to certain embodiments. The computing environment 100 includes the augmented-reality visual identification system 102 (which may be included in or otherwise used by a marketing apparatus), one or more computing devices 104, and one or more online services 106. The augmented-reality visual identification system 102, computing devices 104, and online services 106 are communicatively coupled via one or more data networks 108 (e.g., the Internet one or more local area networks ("LAN"), wired area networks, one or more wide area networks, or some combination thereof).

Each of the computing devices 104 is connected (or otherwise communicatively coupled) to a marketing apparatus 110 via the data network 108. A user of one of the computing devices 104 uses various products, applications, or services supported by the marketing apparatus 110 via the data network 108. Examples of the users include, but are not limited to, marketing professionals who use digital tools to generate, edit, track, or manage online content, or to manage online marketing processes, end users, administrators, users who use document tools to create, edit, track, or manage documents, advertisers, publishers, developers, content owners, content managers, content creators, content viewers, content consumers, designers, editors, any combination of these users, or any other user who uses digital tools to create, edit, track, or manage digital experiences.

Digital tools, as described herein, include a tool that is used for performing a function or a workflow electronically. Examples of the digital tool include, but are not limited to, content creation tool, content editing tool, content publishing tool, content tracking tool, content managing tool, content printing tool, content consumption tool, any combination of these tools, or any other tool that may be used for creating, editing, managing, generating, tracking, consuming or performing any other function or workflow related to content. Digital tools include the augmented-reality visual identification system 102.

Digital experience, as described herein, includes experience that may be consumed through an electronic device. Examples of the digital experience include, but are not limited to, content creating, content editing, content tracking, content publishing, content posting, content printing, content managing, content viewing, content consuming, any combination of these experiences, or any other workflow or function that may be performed related to content.

Content, as described herein, includes electronic content. Examples of the content include, but are not limited to, image, video, web site, webpage, user interface, menu item, tool menu, magazine, slideshow, animation, social post, comment, blog, data feed, audio, advertisement, vector graphic, bitmap, document, any combination of one or more content, or any other electronic content.

The augmented-reality visual identification system 102 includes one or more devices that provide and execute one or more engines for providing one or more digital experiences to a user. In some examples, the augmented-reality visual identification system 102 is implemented using one or more servers, one or more platforms with corresponding application programming interfaces, cloud infrastructure and the like. In addition, in some examples, each engine is implemented using one or more servers, one or more platforms with corresponding application programming interfaces, cloud infrastructure and the like.

The augmented-reality visual identification system 102 also includes a data storage unit 112. In some examples, the data storage unit 112 is be implemented as one or more databases or one or more data servers. The data storage unit 112 includes data that may be used by the engines of the augmented-reality visual identification system 102.

In some embodiments, the augmented-reality visual identification system 102 is divided into two layers of engines. For example, Layer 1 includes core engines that provide workflows to the user and Layer 2 includes shared engines that are shared among the core engines. In some embodiments, any core engine calls any of the shared engines for execution of a corresponding task. In additional or alternative embodiments, the augmented-reality visual identification system 102 does not have layers, and each core engine has an instance of the shared engines. In various embodiments, each core engine accesses the data storage unit 112 directly or through the shared engines.

In some embodiments, the user of the computing device 104 visits a webpage or an application store to explore applications supported by the augmented-reality visual identification system 102. The augmented-reality visual identification system 102 provides the applications as a software as a service ("SaaS"), or as a standalone application that may be installed on one or more of the computing devices 104, or as a combination.

In some embodiments, the user creates an account with the augmented-reality visual identification system 102 by providing user details and also by creating login details. In additional or alternative embodiments, the augmented-reality visual identification system 102 automatically creates login details for the user in response to receipt of the user details. The user may also contact the entity offering the services of the augmented-reality visual identification system 102 and get the account created through the entity. The user details are received by a subscription engine 114 and stored as user data 116 in the data storage unit 112. In some embodiments, the user data 116 further includes account data 118, under which the user details are stored. In some embodiments, the user is also prompted to install an application manager. The application manager enables the user to manage installation of various applications supported by the augmented-reality visual identification system 102.

In some embodiments, a user may opt for a trial or a subscription to one or more engines of the augmented-reality visual identification system 102. Based on the trial account or the subscription details of the user, a user subscription profile 120 is generated by the subscription engine 114 and stored. The user subscription profile 120 is stored in the data storage unit 112 and indicates entitlement of the user to various products or services. The user subscription profile 120 also indicates a type of subscription, e.g., a free trial, a premium subscription, or a regular subscription.

Each engine of the augmented-reality visual identification system 102 also stores customer data 122 for the user in the data storage unit 112. In some examples, the user or the entity of the user has one or more customers, including potential customers, and hence, the one or more engines of the augmented-reality visual identification system 102 store the customer data 122. In some examples, the customer data 122 is shared across these engines or is specific to each engine. In some embodiments, access data 124 is a part of the customer data 122. The access to the customer data 122 is controlled by an access control engine 126, which may be shared across the engines of the augmented-reality visual identification system 102 or each engine has one instance of the access control engine 126. The access control engine 126 determines if the user has access to a particular customer data 122 based on the subscription of the user and access rights of the user.

In some examples, a user of the augmented-reality visual identification system 102 enables tracking of content while viewing content, while creating content, or at any point. Various methods of tracking may be used. For example, tracking code is embedded into the content for tracking and sending tracked data to an augmented-reality engine 128. The augmented-reality engine 128 tracks the data and stores the tracked data as augmented reality data 130 or other data. The augmented-reality engine 128 tracks the data and performs meaningful processing of the augmented reality data 130 or other data to provide various reports to the user. In addition, in some embodiments, the augmented-reality engine 128 also acts as a shared engine and is accessible by other engines to obtain meaningful analysis on the basis of which other engines may offer various functionalities to the user. In additional or alternative embodiments, each engine can have an instance of the augmented-reality engine 128, which is customized according to a need of that engine. In various embodiments, the augmented-reality engine 128 is used for tracking one or more types of content, such as mobile applications, video, image, animation, website, document, advertisements, etc. In some embodiments, the augmented-reality engine 128 also supports predictive intelligence to provide predictions based on the augmented reality data 130 or other data. In some embodiments, the augmented-reality engine 128 also stitches information tracked from various sources where the content is consumed and provides a holistic view (e.g., a 360 degree view) of the augmented reality data 130 or other user data.

In some embodiments, the augmented-reality visual identification system 102 also includes a content personalization engine 132. The content personalization engine 132 enables the user to provide different digital experiences to the customers when different customers visit a same webpage or a same application of the user. The content personalization engine 132 provides various workflows to the user to create different versions of the webpage or application or the content and to perform A/B testing. Based on the testing, the user may choose to provide different personalization for different sets of customers. The content personalization engine 132 also uses the customer data 122. The customer data 122 includes customer profiles. The customers, as described herein, also include mere visitors that are not customers yet. A customer profile includes one or more attributes of the customer. An attribute, as described herein, is a concept using which the customer can be segmented.

Examples of the attribute include, but are not limited to, geographic location, age, gender, purchase capacity, language, habits, browsing trends, or any other attribute using which the customers can be segmented.

The customer data 122, at least some of which may be included in the augmented reality data 130 or stored separately from the augmented reality data 130, is generated by a customer segmentation engine 134 by collecting data from different sources including electronic sources, such as, for example, the augmented-reality engine 128, online forms, customer submitting data online, and other online sources, and non-electronic sources including, for example, paper forms and other offline sources. In some examples, customer data 122 is shared between users and some of the customer data 122 is specific to each user and not accessible by other users. The customer segments are used by the customer segmentation engine 134 to personalize content and show relevant content to the customers. In addition, the content personalization engine 132 provides automated workflows to enable the personalization including providing recommendations for the content that should be shown to a particular customer segment.

In some embodiments, the augmented-reality visual identification system 102 includes the augmented-reality engine 128, an identification engine 140, and a machine-learning algorithm engine 142.

The engines 128, 140, 142 each include one or more instructions stored on a computer-readable storage medium and executable by processors of one or more computing devices. When executed by the one or more processors, the computer-executable instructions of the augmented-reality visual identification system 102 cause the augmented-reality visual identification system 102 to identify augmented-reality visuals that influences user behavior in a virtual commerce environment. In additional or alternative embodiments, the engines 128, 140, 142 include hardware, such as a special purpose processing device to perform a certain function or group of functions. Additionally or alternatively, the engines 128, 140, 142 each include a combination of computer-executable instructions and hardware.

In the example depicted in FIG. 1, one or more engines 128, 140, 142 of the augmented-reality visual identification system 102 and the data storage unit 112 communicate via the data network 108.

In some embodiments, the augmented-reality engine 128 or the content personalization engine 132 is configured to provide content (e.g., texts, images, sounds, videos, animations, documents, user interfaces, etc.) to a user (e.g., to a user of the augmented-reality visual identification system 102 or a user of the computing device 104). As an example, the augmented-reality engine 128 provides an image in any format to the user. If the content includes computer generated images, the augmented-reality engine 128 generates the images and display the images on a display device associated with the augmented-reality visual identification system 102 or the computing device 104. If the content includes video or still images, the augmented-reality engine 128 generates views of the video or still images for display on the display device. In some embodiments, the augmented-reality engine 128 accesses or obtains the video or still images (e.g., from one or more databases or data sources) and generate views of the video or still images for display on the display device. If the content includes audio content the augmented-reality engine 128 generates electronic signals that will drive a speaker, which may be a part of the display device, to output corresponding sounds. In some embodiments, the content, or the information or data from which the content is derived, may be obtained by the augmented-reality engine 128 from the data storage unit 112, which may be part of the augmented-reality visual identification system 102, as illustrated in FIG. 1, or may be separate from the augmented-reality visual identification system 102 and communicatively coupled to the augmented-reality visual identification system 102. In some embodiments, the augmented-reality engine 128 generates or accesses content and transmits the content to a display device (e.g., a display device associated with the augmented-reality visual identification system 102 or the computing device 104).

For example, the augmented-reality engine 128 includes one or more AR devices and the augmented-reality engine 128 generates an AR environment for display on a display device. The AR environment includes an environment that is at least partially virtual. As an illustrative example, the augmented-reality engine 128 recognizes one or more physical objects in a physical space using various image recognition methods and techniques, such as, for example, by capturing images of the physical objects or the physical space and transmitting the images of the physical objects to a server that performs the image recognition operations or by recognizing specific codes disposed on a physical object. The augmented-reality engine 128 also generates virtual objects (e.g., items, icons, or other user interface components) with which a user of the augmented-reality visual identification system 102 or computing device 104 may interact. The augmented-reality engine 128 then generates one or more AR visuals (e.g., frames, images, etc.) that include the recognized physical objects, physical space, and the generated virtual and transmits data corresponding to the AR visuals to a display device. The display device displays an AR environment that includes the recognized physical objects and the physical space augmented with the virtual objects by concurrently displaying the virtual objects, along with the physical objects or physical space.

A user of the augmented-reality visual identification system 102 or the computing device 104 views the AR environment and provides user input (e.g., using a game controller, keyboard, mouse, joystick, etc., which, in some examples, is communicatively coupled to the augmented-reality visual identification system 102 or the computing device 104) to interact with the AR environment (e.g., to interact with a virtual object in the AR environment or to manipulate the virtual object). For example, the user provides user input to move or adjust a position of a virtual object in the AR environment and the augmented-reality engine 128 causes the virtual object to move accordingly. In some embodiments, the augmented-reality engine 128 receives signals based on user input and determines an interaction with or manipulation of a virtual object within the AR environment based on the signals. In some examples, the augmented-reality engine 128 also generates a virtual commerce ("v-commerce") environment using the AR environment. In the v-commerce environment, a virtual object in the AR environment corresponds to a real world physical object that may be available for sale (e.g., by a merchant). In some embodiments, the user provides one or more user inputs as the user interacts with the v-commerce environment. For example, the user provides user input indicating a request for information about a real world physical object represented by a virtual object in the v-commerce environment (e.g., by selecting a virtual icon or other virtual user interface component to request information about a price, availability, etc. of the real world physical object). As another example, the user provides user input to purchase the real world physical object. In some embodiments, the augmented-reality engine 128 generates and provides various AR visuals to the user as the user views and interacts with the v-commerce environment.

In the example depicted in FIG. 1, one or more engines 128, 140, 142, 144 of the augmented-reality visual identification system 102 and the data storage unit 112 communicate via the data network 108. For example, the augmented-reality engine 128 transmits augmented-reality content data 136 to the data storage unit 112. Augmented-reality content data 136 includes, but is not limited to, data about an AR or v-commerce environment generated and provided to a user by the augmented-reality engine 128. In some examples, the data indicates one or more AR visuals generated by the augmented-reality engine 128 and provided to the user. Examples of augmented-reality content data 136 include, but are not limited to, data about an AR visual generated by the augmented-reality engine 128, a physical space in the AR visual, a physical object in the AR visual, a virtual object in the AR visual, a time that the AR visual is generated and provided to the user, a time that the augmented-reality engine 128 stops providing the AR visual to the user, a duration of time that the AR image is provided to the user, a duration of the AR or v-commerce environment session (e.g., a length of time from the time a first AR visual is provided to the user to the time a last AR visual is provided to the user), etc. The augmented-reality engine 128 also transmits user input data 138 to the data storage unit 112. User input data 138 includes, but is not limited to, data about user input provided by the user of the augmented-reality visual identification system 102 or computing device 104. The user input data 138 includes, for example, data indicating a time that the user provides the user input, a type of user input (e.g., interaction with a virtual object, manipulation of the virtual object, selection of a virtual icon or other virtual user interface), or any other data associated with user input provided by the user of the augmented-reality visual identification system 102 or computing device 104.

In some embodiments, the data storage unit 112 transmits augmented-reality content data 136 to the identification engine 140 via the data network 108. In additional or alternative embodiments, the data storage unit transmits user input data 138 to the identification engine 140. In some embodiments, the identification engine 140 receives or obtains augmented-reality content data 136 or user input data 138 from the one or more computing devices 104, the data storage unit 112, user input (e.g., if a user programs the identification engine 140 to include augmented-reality content data 136, user input data 138, or other data), or any other source. In some embodiments, the identification engine 140 detects user input data 138 (e.g., detects user input provided by the user of the augmented-reality visual identification system 102 or computing device 104).

In some embodiments, the augmented-reality visual identification system 102 identifies or determines a correlation between AR visuals and user input. For example, the augmented-reality visual identification system 102 identifies or determines an AR visuals influencing or affecting user behavior in a v-commerce environment based on augmented-reality content data 136 or user input data 138. For example, the identification engine 140 is electrically or communicatively coupled to the data storage unit 112 or the augmented-reality engine 128 as described above and receives, detects, or obtains data from the data storage unit 112 or the augmented-reality engine 128 (e.g., receives augmented-reality content data 136 or user input data 138). The identification engine 140 then analyzes the data to determine or identify, based on the data, an AR visual that is viewed by the user that influences or affects the user's behavior in the v-commerce environment.

For example, augmented-reality content data 136 includes data about various AR visuals of a v-commerce environment that are viewed by a user. The identification engine 140 also obtains data indicating a triggering user input (e.g., from one or more computing devices 104, the data storage unit 112, user input, or any other source). A triggering user input includes, for example, a predetermined or a particular user input that may be provided by the user while viewing, or interacting with, the v-commerce environment and detected by the identification engine 140. As an illustrative example, the data indicates that a triggering user input is any user input indicating a request for information about a real world physical object represented by a virtual object in the v-commerce environment. As another example, the data indicates that a triggering user input is any user input provided by the user to purchase the real world physical object represented by the virtual object. In some embodiments, a triggering user input is any predetermined user input that the user may provide while interacting with an AR or v-commerce environment and is detectable by the identification engine 140. The identification engine 140 also obtains or detects user input data 138, which includes data about one or more user inputs provided by the user as the user views the v-commerce environment. The identification engine 140 then identifies or determines, based on the data received, one or more AR visuals of the various AR visuals. For example, the identification engine 140 identifies an AR visual in response to determining that the user provided a user input that corresponds to a triggering user input (e.g., provided a user input that is similar to a triggering user input). As an example, the identification engine 140 analyzes user input data 138 and a triggering user input and identifies an AR visual that is viewed by the user at or near a time that the user provides a user input that corresponds to the triggering user input or viewed by the user substantially simultaneous with the user providing the user input corresponding to the triggering user input (e.g., the AR visual viewed by the user as the user provides user input requesting information about a real world physical object represented by a virtual object in the v-commerce environment).

In some embodiments, the identified AR visual is the AR visual of the various AR visuals viewed by the user that influences the user's behavior in the v-commerce environment. For example, the identified AR image is the AR image that influenced or caused the user to provide the triggering user input (e.g., influenced the user to provide user input requesting information about the real world physical object represented by the virtual object or provide user input to purchase the real world physical object). In some embodiments, the identified AR visual is used to improve recommendation of various actions to the user (e.g., to recommend, to the user, various additional virtual objects representing real world physical objects available for sale based on the physical space, the physical objects, or the virtual objects in the identified AR visual), which provides users with content with which the user is more likely to engage (e.g., by increasing a likelihood of a user interacting with a virtual object or making a purchase by providing or recommending visuals that are likely to influence user behavior). In another example, the identified AR visual is used to segment the user (e.g., to identify, based on the physical space, the physical objects, or the virtual objects in the identified AR visual, user preferences and group users based on similar user preferences or to group users based on a similarity between identified AR visuals associated with the users). Thus, in some embodiments, the identification engine 140 transmits data indicating the identified AR visual to one or more databases (e.g., the data storage unit 112), which stores data indicating the identified AR visual.

In some embodiments, the augmented-reality visual identification system 102 determines or identifies an AR visual that influences user behavior in the v-commerce environment regardless of whether the user provides a user input that corresponds to a triggering user input. For example, the user may view the AR or v-commerce environment generated and provided by the augmented-reality engine 128 and may not provide user input. As another example, the user may view the AR or v-commerce environment and may not provide user input that corresponds to the predetermined triggering user input. In some such embodiments, the user input data 138 may not include any data or may not include data indicating a user input that corresponds to a triggering user input. In this example, the identification engine 140 obtains augmented-reality content data 136 that includes data about various AR visuals of a v-commerce environment that is viewed by the user. The augmented-reality content data 136 also includes data indicating a time that an AR visual is generated and provided to the user, a time that the augmented-reality engine 128 stops providing the AR visual to the user, a duration of time that the AR visual is provided to the user, a duration of the AR or v-commerce environment session, etc. The identification engine 140 then determines or identifies an AR visual of the various AR visuals based on the data received. For example, the identification engine 140 identifies the AR image based on an epoch time (e.g., a particular or determined) after the user begins to view the v-commerce environment. In some embodiments, the epoch time corresponds to a time after the user begins to view the v-commerce environment at which the user is likely to provide a user input that corresponds to a triggering user input.

As an example, the augmented-reality content data 136 includes data indicating various AR visuals generated and provided to a user and a time that a first AR visual is generated and provided to the user. The augmented-reality content data 136 may also include data indicating a duration of time of the v-commerce environment session and a time stamp indicating a time that each of the various AR visuals was provided to the user. The identification engine 140 determines or calculates an epoch time after the time that the first AR visual is generated and provided to the user at which the user is likely to provide user input that corresponds to a triggering user input (e.g., a particular time after the first AR visual is provided that user is likely to provide user input requesting information about a real world physical object represented by a virtual object in the v-commerce environment or user input to purchase the real world physical object). In another embodiment, the identification engine 140 obtains data indicating the epoch time from one or more computing devices 104, a data storage unit 112, a machine-learning algorithm engine 142, user input (e.g., if a user programs the identification engine 140 to include the data), or any other source. The identification engine 140 then determines or identifies an AR visual that is provided to user or viewed by the user at or near the epoch time. For example, the identification engine 140 identifies an AR visual that is viewed by the user at the epoch time or immediately prior to the epoch time (e.g., by comparing time stamps associated with each of the various AR visuals and the epoch time and identifying an AR visual viewed by the user at the epoch time). As another example, the identification engine 140 identifies an AR visual that is viewed by the user after the user has viewed a percentage of the various AR visuals and viewed by the user prior to the epoch time.

In some embodiments, the machine-learning algorithm engine 142 is electrically or communicatively coupled to the data storage unit 112 or the augmented-reality engine 128 and the machine-learning algorithm engine 142 receives or obtains data from the data storage unit 112 or the augmented-reality engine 128 (e.g., receives augmented-reality content data 136 or user input data 138). The machine-learning algorithm engine 142 then trains a machine-learning algorithm based on the data obtained or received. For example, the machine-learning algorithm engine 142 receives augmented-reality content data 136 that includes data about an AR or v-commerce environment generated and provided to a user by the augmented-reality engine 128. The data includes data about an AR visual generated by the augmented-reality engine 128, a physical space in the AR visual, a physical object in the AR visual, a virtual object in the AR visual, a number of times a user adjusts a position, location, or orientation of the virtual object in the AR visual, a time that the AR visual is generated and provided to the user, a time that the augmented-reality engine 128 stops providing the AR visual to the user, a duration of time that the AR image is provided to the user, a duration of the AR or v-commerce environment session (e.g., a length of time from the time a first AR visual is provided to the user to the time a last AR visual is provided to the user), etc. The machine-learning algorithm engine 142 also receives user input data 138 that includes data about user input provided by the user such as, for example, data indicating a time that the user provides the user input, a type of user input (e.g., interaction with a virtual object, manipulation of the virtual object, selection of a virtual icon or other virtual user interface), or any other data associated with user input provided by the user.

The machine-learning algorithm engine 142 then trains the machine-learning algorithm based on the augmented-reality content data 136 and the user input data 138. A machine-learning algorithm is a machine-learning model that uses statistical learning algorithms that are used to estimate or approximate functions that depend on a large number of inputs in a non-linear, distributed, and parallel manner. In some examples, the statistical learning algorithm includes a class of statistical learning models such as, for example, survival models. In other examples, the statistical learning algorithm includes any statistical learning model. An example of the machine-learning algorithm includes a neural network. A computer learning machine-learning algorithm is an interconnected group of nodes, called neurons. A machine-learning algorithm includes input nodes, output nodes, and intermediary nodes. In some embodiments, the connections between each node are weighted with a set of adaptive weights that are tuned by a learning algorithm, and are capable of approximating non-linear functions of their inputs. In some embodiments, the machine-learning algorithm engine 142 trains the machine-learning algorithm to predict or calculate an epoch time as described above.

For instance, the machine-learning algorithm engine 142 obtains augmented-reality content data 136 about one or more AR or v-commerce environments generated and provided to various users (e.g., a duration of time between a time that a first AR visual is provided to a user and a time that the last AR visual is provided to the user, a number of virtual objects generated and provided to the user in the v-commerce environment, etc.) The machine-learning algorithm engine 142 also obtains user input data 138 indicating user input provided by the various users (e.g., a number of times a user changes an orientation or position of a virtual object in the v-commerce environment, data indicating whether the user provided user input corresponding to a triggering user input, a time during the duration of the user's v-commerce session that the user provides the user input corresponding to the triggering user input, etc.). The machine-learning algorithm engine 142 trains the machine-learning algorithm to predict an epoch time based on the data. As an example, the machine-learning algorithm uses various methods and techniques to train the machine-learning algorithm to calculate or predict a particular time after the a first AR visual is provided to a user that the user is likely to provide a user input that corresponds to triggering user input. In some embodiments, the identification engine 140 is electrically or communicatively coupled to the machine-learning algorithm engine 142 and the identification engine 140 uses the machine-learning algorithm to predict or calculate an epoch time or obtain data from the machine-learning algorithm engine 142 indicating a predicted or calculated epoch time. The identification engine 140 then determines or identifies an AR visual based on an epoch time in substantially the same manner as described above.

In this manner, the augmented-reality visual identification system 102 identifies or determines one or more AR visuals that influence user behavior in a v-commerce environment or that are likely to influence user behavior in the v-commerce environment and the identified AR visual may be used to improve recommendation of various actions to a user (e.g., used to provide users with content with which the user is more likely to engage such as, for example, by increasing a likelihood of a user interacting with a virtual object or making a purchase by providing or recommending visuals that are likely to influence user behavior).

In the example depicted in FIG. 1, a user interfaces with the one or more computing devices 104 to access the augmented-reality visual identification system 102. In some embodiments, each of the computing devices 104 represents various types of client devices. For example, the computing device 104 is a mobile device (e.g., a mobile telephone, a smartphone, a PDA, a tablet, a laptop, a camera, a watch, a wearable device, etc.). The computing device 104, however, in some embodiments, is a non-mobile device (e.g., a desktop computer or another type of client device). In some embodiments, the augmented-reality visual identification system 102 is executed on the one or more computing devices 104 via an augmented-reality visual identification application 144. In this example, the computing devices 104 include one or more of the components of the augmented-reality visual identification system 102.

Although the exemplary environment 100 of FIG. 1 is depicted as having a certain number of components, in other embodiments, the exemplary environment 100 has any number of additional or alternative components. Further, while FIG. 1 illustrates a particular arrangement of the augmented-reality visual identification system 102, computing devices 104, data storage unit 112, and the data network 108, various additional arrangements are possible. As an example, while FIG. 1 illustrates the augmented-reality engine 128, the data storage unit 112, and the augmented-reality visual identification system 102 as part of a single system, in some embodiments, the augmented-reality engine 128, the data storage unit 112, and the augmented-reality visual identification system 102 are separate components that may be implemented using different servers.

Figure 2:
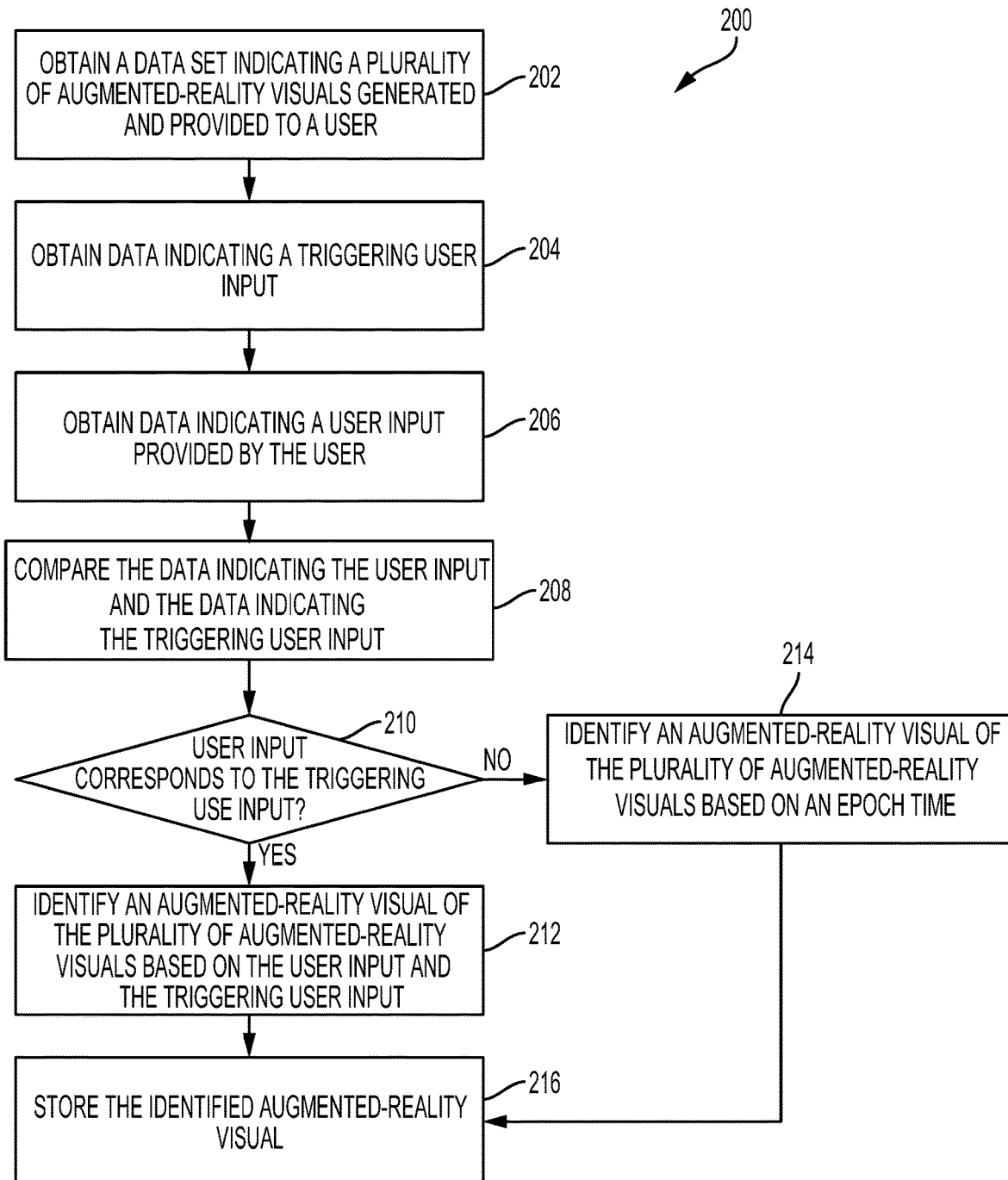
FIG. 2 is a flow chart depicting an example of a process for identifying an augmented-reality visual that influences user behavior in a virtual commerce environment, according to certain embodiments.

FIG. 2 is a flow chart depicting an example of a process 200 for identifying an AR visual that influences user behavior in a v-commerce environment. In some embodiments, one or more processing devices such as, for example, the computing system described herein with respect to FIG. 6, implement operations depicted in FIG. 2 by executing suitable program code (e.g., the augmented-reality visual identification system 102 of FIG. 1) that implements one or more algorithms encompassed by the process 200. For illustrative purposes, the process 200 is described with reference to the examples depicted in FIG. 1, but other implementations are possible.

In block 202, a data set indicating various AR visuals generated and provided to a user is obtained. In some embodiments, one or more processing devices execute an identification engine 140 to obtain the data set, which includes augmented-reality content data 136. For example, the identification engine 140 obtains or receives the data set from one or more computing devices 104, a data storage unit 112, an augmented-reality engine 128, user input (e.g., if a user programs the identification engine 140 to include the data set), or any other source.

In some embodiments, identification engine 140 accesses the data set from a non-transitory computer-readable medium that is local to the computing system that executes the identification engine 140. Accessing the augmented-reality content data 136 involves transmitting suitable electronic signals via a data bus that communicatively couples the non-transitory computer-readable medium and a processing device. These signals cause at least some of the data from the non-transitory computer-readable medium to be stored in a random-access memory or other memory device that allows rapid retrieval of data for processing operations performed by the computing system that executes the identification engine 140.

In additional or alternative embodiments, the identification engine 140 accesses, via a data network 108, at least some of the augmented-reality content data 136 from a non-transitory computer-readable medium that is remote from the computing system that executes the identification engine 140. Accessing the augmented-reality content data 136 involves transmitting suitable electronic signals via a networking interface device that communicatively couples, via the data network 108, a computing system that executes the identification engine 140 with another computing system that is communicatively coupled to the non-transitory computer-readable medium via a data bus or other form of local access. These signals cause at least some of the data from the non-transitory computer-readable medium to be transmitted over the data network 108, received via the network interface device of the computing system that executes the identification engine 140, and stored in a random-access memory or other memory device that allows rapid retrieval of data for processing operations performed by the computing system that executes the identification engine 140.

In some embodiments, the augmented-reality engine 128 provides an AR environment by generating one or more AR visuals that include one or more recognized physical objects and a physical space augmented with one or more virtual objects. The augmented-reality engine 128 also generates a v-commerce environment that includes the AR environment. In the v-commerce environment, a virtual object in the AR environment corresponds to a real world physical object that may be available for sale (e.g., by a merchant). In some embodiments, the augmented-reality engine 128 generates and provides the various AR visuals to the user as the user views and interacts with the v-commerce environment. For example, FIG. 3 is an example of an AR visual 302 that simulates a v-commerce environment 300, according to certain embodiments.

Figure 3:
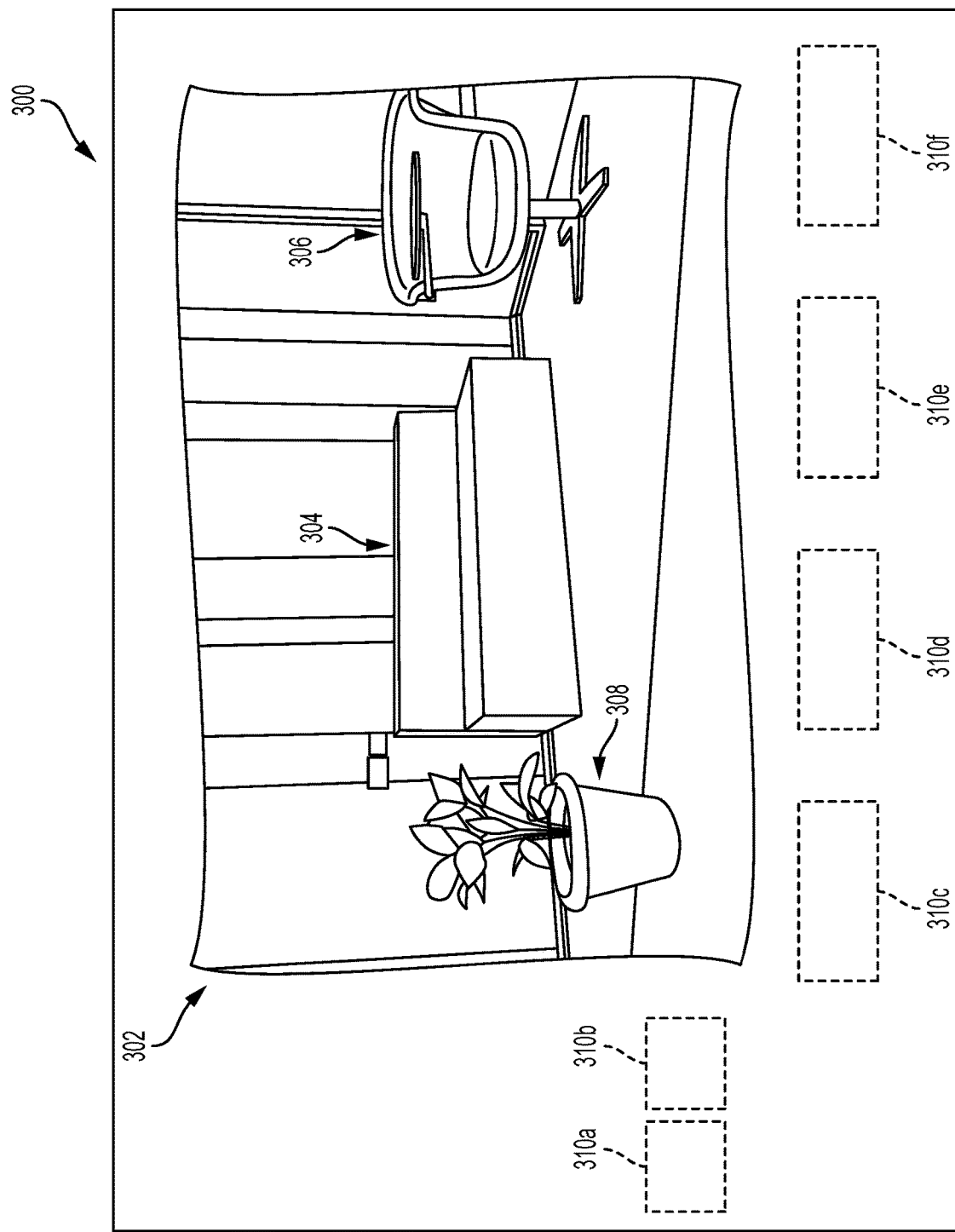
FIG. 3 is an example of an augmented-reality visual that simulates a virtual commerce environment, according to certain embodiments.

In the example depicted in FIG. 3, the AR visual 302 includes recognized physical objects 304, 306, 308. The AR visual 302 also includes virtual icons 310a-f. In some examples, each virtual icon 310a-f allows the user to interact with the v-commerce environment 300 in various ways. For example, each virtual icon 310a-f corresponds to a different interaction with, or manipulation of, the v-commerce environment 300 and the user uses the virtual icons 310a-f to indicate a desired or particular manipulation or interaction. The augmented-reality engine 128 then causes an interaction or manipulation to occur within the v-commerce environment 300 based on the user input. As an example, the virtual icon 310a is a virtual icon that allows the user to zoom-in to the v-commerce environment (e.g., zoom in to the AR visual 302) and the user provides user input indicating a selection of the virtual icon 310a. The augmented-reality engine 128 then generates a zoomed in view of the AR visual 302. As another example, the virtual icon 310f is a virtual icon that indicates a virtual object that may be generated and provided by the augmented-reality engine 128 and the augmented-reality engine 128 generates and provides the virtual object in the v-commerce environment 300 based on user input indicating a selection of the virtual icon 310f. For example, FIG. 4 is an image of another example of an AR visual 400 that simulates the v-commerce environment of FIG. 3 (e.g., an AR visual that may be generated in response to the user selecting the virtual icon 310f).

Figure 4:
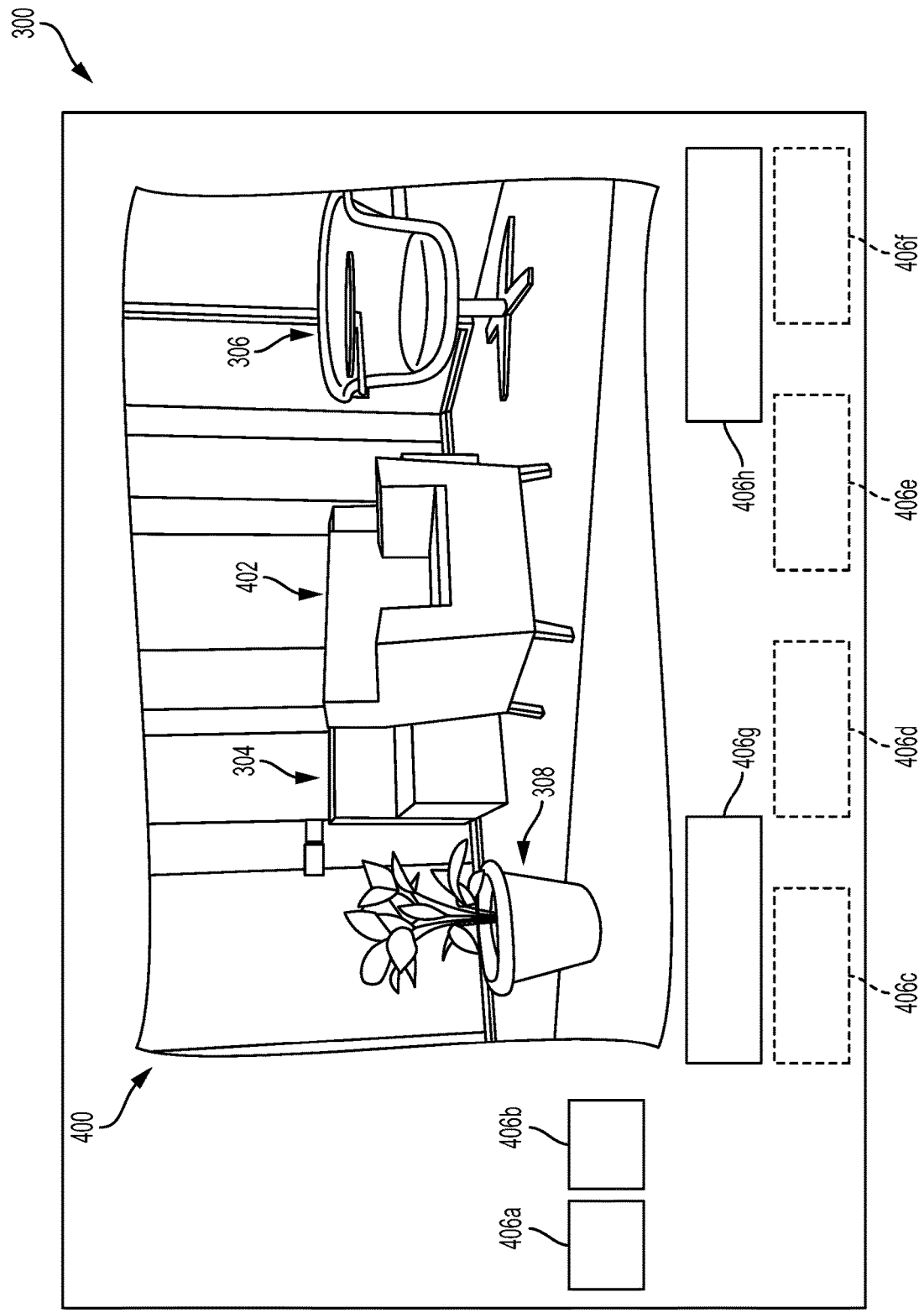
FIG. 4 is another example of an augmented-reality visual that simulates the virtual commerce environment of FIG. 3, according to certain embodiments.

In the example depicted in FIG. 4, the augmented-reality engine 128 generates the AR visual 400 in response to the user input indicating a selection of a virtual icon corresponding to a virtual object (e.g., in response to the selection of the virtual icon 310f of FIG. 3). In this example, the AR visual 400 includes virtual icons 406a-h, each of which may be configured in substantially the same manner as virtual icons 310a-f of FIG. 3 (e.g., may allow the user to provide user input to interact with the v-commerce environment 300). In this example, the augmented-reality engine 128 generates and provides a virtual object 402 (e.g., in response to the user selecting the virtual icon 310f of FIG. 3) and the virtual object 402 augments the physical space and physical objects 304, 306, 308 in the AR visual 400. The virtual object 402 corresponds to a real world physical object that may be available for sale (e.g., a chair available for sale) and the user interacts with the virtual object 402 (e.g., by providing user input to interact with, or manipulate, the virtual object 402). In the v-commerce environment 300, the user also provides one or more user inputs to engage in commerce. As an example, the virtual icon 406c is an icon that allows the user to select one or more additional virtual objects to be displayed in the v-commerce environment 300 (e.g., the virtual icon 406c may be configured in substantially the same manner as virtual icon 310f of FIG. 3). The augmented-reality engine 128 then generates and display additional virtual objects in the v-commerce environment 300 in response to the user selecting the virtual icon 406c. The virtual icon 406g is a virtual icon that allows the user to request information about the real world physical object that is represented by the virtual object 402 (e.g., info about a price or availability of the real world physical object) and the augmented-reality engine 128 displays information about the real world physical object in response to the user providing user input selecting virtual icon 406g. As another example, the virtual icon 406h is an icon that allows the user to purchase the real world physical object represented by the virtual object 402 and the user provides user input indicating a selection of the virtual icon 406h. The augmented-reality engine 128 may then display one or more additional AR visuals to allow the user to purchase the real world physical object.

Returning to FIG. 2, in some embodiments, the data set obtained at block 202 includes data about the AR or v-commerce environment generated and provided, by the augmented-reality engine 128 (e.g., data about the v-commerce environment 300 of FIGS. 3-4). The data indicates one or more AR visuals generated by the augmented-reality engine 128 and provided to the user (e.g., the AR visual 302 of FIG. 3 or the AR visual 400 of FIG. 4). For example, the data set includes data about the AR visual generated, a physical space in the AR visual, a physical object in the AR visual (e.g., physical objects 304, 306, 308 of FIGS. 3-4), a virtual object in the AR visual (e.g., virtual object 402 of FIG. 4), a time that the AR visual is generated and provided to the user, a time that the augmented-reality engine 128 stops providing the AR visual to the user, a duration of time that the AR visual is provided to the user, a duration of an AR or v-commerce environment session that includes one or more AR visual (e.g., a length of time from the time a first AR visual is provided to the user to the time a last AR visual is provided to the user), etc.

In block 204, data indicating a triggering user input is obtained. In some embodiments, one or more processing devices execute the identification engine 140 to obtain the data. For example, the identification engine 140 obtains or receives the data from one or more computing devices 104, a data storage unit 112, an augmented-reality engine 128, user input (e.g., if a user programs the identification engine 140 to include the data), or any other source.

In some embodiments, identification engine 140 accesses the data from a non-transitory computer-readable medium that is local to the computing system that executes the identification engine 140. Accessing the data indicating the triggering user input involves transmitting suitable electronic signals via a data bus that communicatively couples the non-transitory computer-readable medium and a processing device. These signals cause at least some of the data from the non-transitory computer-readable medium to be stored in a random-access memory or other memory device that allows rapid retrieval of data for processing operations performed by the computing system that executes the identification engine 140.

In additional or alternative embodiments, the identification engine 140 accesses, via a data network 108, at least some of the data indicating the triggering user input from a non-transitory computer-readable medium that is remote from the computing system that executes the identification engine 140. Accessing the data indicating the triggering user input involves transmitting suitable electronic signals via a networking interface device that communicatively couples, via the data network 108, a computing system that executes the identification engine 140 with another computing system that is communicatively coupled to the non-transitory computer-readable medium via a data bus or other form of local access. These signals cause at least some of the data from the non-transitory computer-readable medium to be transmitted over the data network 108, received via the network interface device of the computing system that executes the identification engine 140, and stored in a random-access memory or other memory device that allows rapid retrieval of data for processing operations performed by the computing system that executes the identification engine 140.

In some embodiments, the data set obtained at block 204 includes data indicating a particular user input that may be provided by the user to interact with the one or more AR visuals provided to the user and detected by the identification engine 140. For example, the data indicates that a triggering user input includes a user input indicating a request for information about a real world physical object represented by a virtual object in the v-commerce environment (e.g., that the triggering user input corresponds to the user selecting the virtual icon 406g of FIG. 4 to request information about the real world physical object that is represented by the virtual object 402). As another example, the data indicates that a triggering user input includes a user input indicating a selection of an option to purchase the real world physical object represented by the virtual object (e.g., that the triggering user input corresponds to the user selecting the virtual icon 406h of FIG. 4 to purchase the real world physical object represented by virtual object 402). In some embodiments, the data indicates that a triggering user input is any predetermined user input that the user may provide while interacting with an AR or v-commerce environment and is detectable by the identification engine 140.

In block 206, data indicating a user input provided by the user is obtained. In some embodiments, one or more processing devices execute the identification engine 140 to obtain the data, which includes user input data 138. For example, the identification engine 140 obtains or receives the data from one or more computing devices 104, a data storage unit 112, an augmented-reality engine 128, user input (e.g., if a user programs the identification engine 140 to include the data), or any other source.

In some embodiments, identification engine 140 accesses the data from a non-transitory computer-readable medium that is local to the computing system that executes the identification engine 140. Accessing the user input data 138 involves transmitting suitable electronic signals via a data bus that communicatively couples the non-transitory computer-readable medium and a processing device. These signals cause at least some of the data from the non-transitory computer-readable medium to be stored in a random-access memory or other memory device that allows rapid retrieval of data for processing operations performed by the computing system that executes the identification engine 140.

In additional or alternative embodiments, the identification engine 140 accesses, via a data network 108, at least some of the user input data 138 from a non-transitory computer-readable medium that is remote from the computing system that executes the identification engine 140. Accessing the user input data 138 involves transmitting suitable electronic signals via a networking interface device that communicatively couples, via the data network 108, a computing system that executes the identification engine 140 with another computing system that is communicatively coupled to the non-transitory computer-readable medium via a data bus or other form of local access. These signals cause at least some of the data from the non-transitory computer-readable medium to be transmitted over the data network 108, received via the network interface device of the computing system that executes the identification engine 140, and stored in a random-access memory or other memory device that allows rapid retrieval of data for processing operations performed by the computing system that executes the identification engine 140.

In some embodiments, the data set obtained at block 206 includes data about user input provided by the user of the augmented-reality visual identification system 102 or computing device 104. The data indicates an input provided by the user as the user views, or interacts with, an AR or v-commerce environment (e.g., user input provided by the user using virtual icons 310a-f of FIG. 3 or virtual icons 406a-h of FIG. 4). For example, the data includes data indicating a time that the user provides the user input, a type of user input (e.g., interaction with a virtual object, manipulation of the virtual object, selection of a particular virtual icon 310a-f of FIG. 3 or virtual icon 406a-h of FIG. 4 or other virtual user interface), or any other data associated with user input provided by the user. In some embodiments, one or more processing devices execute the identification engine 140 to detect the data (e.g., detect user input provided by the user as the user views, or interacts with, an AR or v-commerce environment).

In block 208, the data indicating the user input and the data indicating the triggering user input is compared. In some embodiments, one or more processing devices execute the identification engine 140 to compare the data indicating the user input and the data indicating the triggering user input.

For example, the data set obtained at block 204 includes data indicating a particular user input that corresponds to a triggering user input and the data obtained at block 206 includes data about various user inputs provided by the user as the user views a v-commerce environment (e.g., the v-commerce environment 300 of FIGS. 3-4). The identification engine 140 then analyzes the triggering user input and the various user inputs and compares the user input to the triggering user input. For example, the identification engine 140 compares a user input provided by the user to the triggering user input and determines a correspondence or similarity between the user input and the triggering user input (e.g., determines if the user input matches the triggering user input).

In block 210, the identification engine 140 determines if the user input corresponds to the triggering user input. In some embodiments, one or more processing devices execute the identification engine 140 to determine if the user input corresponds to the triggering user input. As an example, the identification engine 140 compares the user input to the triggering user input (e.g., in block 208) and determines if the user input corresponds to the triggering user input or matches the triggering user input based on the comparison. As an illustrative example, the data obtained at block 204 indicates that a triggering user input includes a user input requesting information about a real world physical object represented by a virtual object in the v-commerce environment. In this example, the identification engine 140 compares user input provided by the user and determine if the user input includes a user input requesting information about a real world physical object represented by a virtual object (e.g., if the user selected the virtual icon 406h of FIG. 4). If the user input corresponds to the triggering user input, the process 200 for identifying an AR visual that influences user behavior in a v-commerce environment continues to block 212. If the user input does not correspond to the triggering user input, the process 200 proceeds to block 214, described below.

In block 212, an AR visual of the various augmented-reality visuals (e.g., the various AR visuals generated and provided at block 202) is identified based on the user input (e.g., the user input received at block 206) and the triggering user input (e.g., the data about the triggering user input received in block 204). In some embodiments, one or more processing devices execute the identification engine 140 to identify the augmented-reality visual of the various augmented-reality visuals based on the user input and the triggering user input.

For example, the data set obtained at block 202 includes data about various AR visuals viewed by the user, the data about the triggering user input obtained at block 204 includes data indicating a particular user input that corresponds to the triggering user input, and the data about the user input obtained at block 206 includes data about various user inputs provided by the user as the views the v-commerce environment. The identification engine 140 then identifies or determines, based on the data received, one or more AR visual of the various AR visuals. As an example, the identification engine 140 compares a user input provided by the user to the triggering user input and determines a correspondence between the user input and the triggering user input (e.g., in block 208 and block 210). The identification engine 140 then identifies an AR visual based on the user input corresponding to the triggering user input. As an example, the identification engine 140 identifies an AR visual viewed by the user at the time the user provides user input that corresponds to the triggering user input (e.g., identifies the AR visual that is viewed by the user at or near the time that the user provides user input requesting information about a real world physical object represented by a virtual object in the v-commerce environment).

In some embodiments, the AR visual identified in block 212 is the AR visual of the various AR visuals viewed by the user that likely influences or causes the user's behavior in a v-commerce environment (e.g., the v-commerce environment 300 of FIGS. 3-4). For example, the AR visual identified in block 212 is the augmented-reality visual that likely influenced the user to provide user input corresponding to the triggering user input (e.g., to provide user input requesting information about the real world physical object represented by the virtual object or to provide user input to purchase the real world physical object). Thus, in some embodiments, the AR visual identified in block 212 is used to improve recommendation of various actions to the user (e.g., to recommend, to the user, various additional virtual objects representing real world physical objects available for sale based on the physical space, the physical objects, or the virtual objects in the identified augmented-reality visual), which provides users with content with which the user is more likely to engage (e.g., by increasing a likelihood of a user interacting with a virtual object or making a purchase by providing or recommending visuals that are likely to influence user behavior).

In some embodiments, in block 212, the identification engine 140 identifies one or more AR visuals based on the epoch time as described above and identify a subset of the identified AR visuals based on other data. As an example, the identification engine 140 obtains accelerometer data indicating a speed or acceleration associated with each identified AR visual (e.g., a speed at which the computing device 104 or an augmented reality device of the augmented-reality engine 128 is moving when each AR visual is generated and provided to the user). The identification engine 140 then identifies a subset of AR visuals from the identified AR visuals based on the accelerometer data. As an example, the identification engine 140 obtains data indicating a threshold accelerometer value (e.g., a threshold value for the speed at which the computing device 104 is moving when an AR visual is generated and provided to the user). The identification engine 140 compares accelerometer data associated with each identified AR visual and the threshold accelerometer value. The identification engine 140 then removes, from the identified AR visuals, one or more AR visuals associated with accelerometer data above the threshold accelerometer value. The identification engine 140 also identifies a subset of one or more AR visuals associated with accelerometer data below the threshold accelerometer value). In this manner, the identification engine 140 identifies a particular AR visual or a subset of AR visuals that are more likely to be clear visuals (e.g., not blurred visuals) based on accelerometer data associated with the AR visuals.

If the user input does not correspond to the triggering user input, in block 214, an AR visual of the various AR visuals (e.g., the various augmented-reality visuals generated and provided of block 202) is identified based on an epoch time. In some embodiments, one or more processing devices execute the identification engine 140 to identify the augmented-reality visual of the various augmented-reality visuals based on the epoch time.

For example, the user may view a v-commerce environment (e.g., the v-commerce environment 300 of FIGS. 3-4) and may not provide any user input or may not provide a user input that corresponds to a triggering user input. In such embodiments, user input data (e.g., the user input data obtained in block 206) may not include data indicating a user input that corresponds to a triggering user input (e.g., in block 210). In this example, the identification engine 140 uses data about various AR visuals provided to one or more users (e.g., data obtained in block 202) and data about user input provided by the one or more users (e.g., data obtained in block 206) to determine or predict an epoch time, which is used to identify an AR visual. In some embodiments, the epoch time corresponds to a time after a user begins to view a v-commerce environment at which the user is likely to provide a particular user input that corresponds to a triggering user input and the identification engine 140 identifies an AR visual of based on the epoch time.

As an example, the data set obtained in block 202 includes data indicating various AR visuals generated and provided to a user in a v-commerce environment (e.g., the v-commerce environment 300 of FIGS. 3-4) and a time that a first AR visual is generated and provided to the user. The data set also includes data indicating a duration of time of the v-commerce environment and a time stamp indicating a time that each of the various AR visuals is provided to the user. The identification engine 140 then determines or calculates, using various methods or techniques, an epoch time after the time that the first AR visual is generated and provided to the user at which the user is likely to provide user input that corresponds to a triggering user input (e.g., a particular time after the first AR visual is provided that the user is likely to provide user input requesting information about a real world physical object represented by a virtual object in the v-commerce environment or user input to purchase the real world physical object) and identify an AR visual based on the epoch time.

In some embodiments, a machine-learning algorithm engine 142 trains a machine-learning algorithm to determine a probability distribution of a particular epoch time (e.g., a probability distribution of a user providing user input corresponding to a triggering user input at or near a particular epoch time). The machine-learning algorithm engine 142 then uses the probability distribution to predict an epoch time. For example, based on the probability distribution, the machine-learning algorithm engine 142 trains a machine-learning algorithm to predict a particular epoch time after a user beings to view a v-commerce environment at which the user is likely to provide a user input that corresponds to a triggering user input. In this example, the identification engine 140 then identifies an AR visual at or near the predicted epoch time.

In block 216, the identified AR visual is stored. In some embodiments, one or more processing devices execute the identification engine 140 to transmit data indicating the identified AR visual (e.g., the augmented-reality visual identified in block 212 or in block 214) to one or more (e.g., the data storage unit 112), which stores data indicating the identified augmented-reality visual.

Returning to block 214, in some embodiments, the identification engine 140 creates a model that predicts an epoch time. The identification engine 140 uses data about various users' interaction with the v-commerce environment such as, for example, a duration of a user's v-commerce session (e.g., a duration of time between a time that the first AR visual is provided to the user and a time that the last AR visual is provided to the user), data indicating a number of times the user changes an orientation or position of a virtual object in the v-commerce environment (e.g., a number of times the user changes a position of the virtual object 402 of FIG. 4), a number of virtual objects generated and provided to the user in the v-commerce environment, data indicating whether the user provided user input corresponding to a triggering user input, a time during the duration of the user's v-commerce session that the user provides the user input corresponding to the triggering user input, or any other data about the user's interaction with the v-commerce environment to train the model to predict the epoch time. In some examples, the identification engine 140 then identifies an AR visual based on the epoch time as described above (e.g., with respect to block 214).

Figure 5:
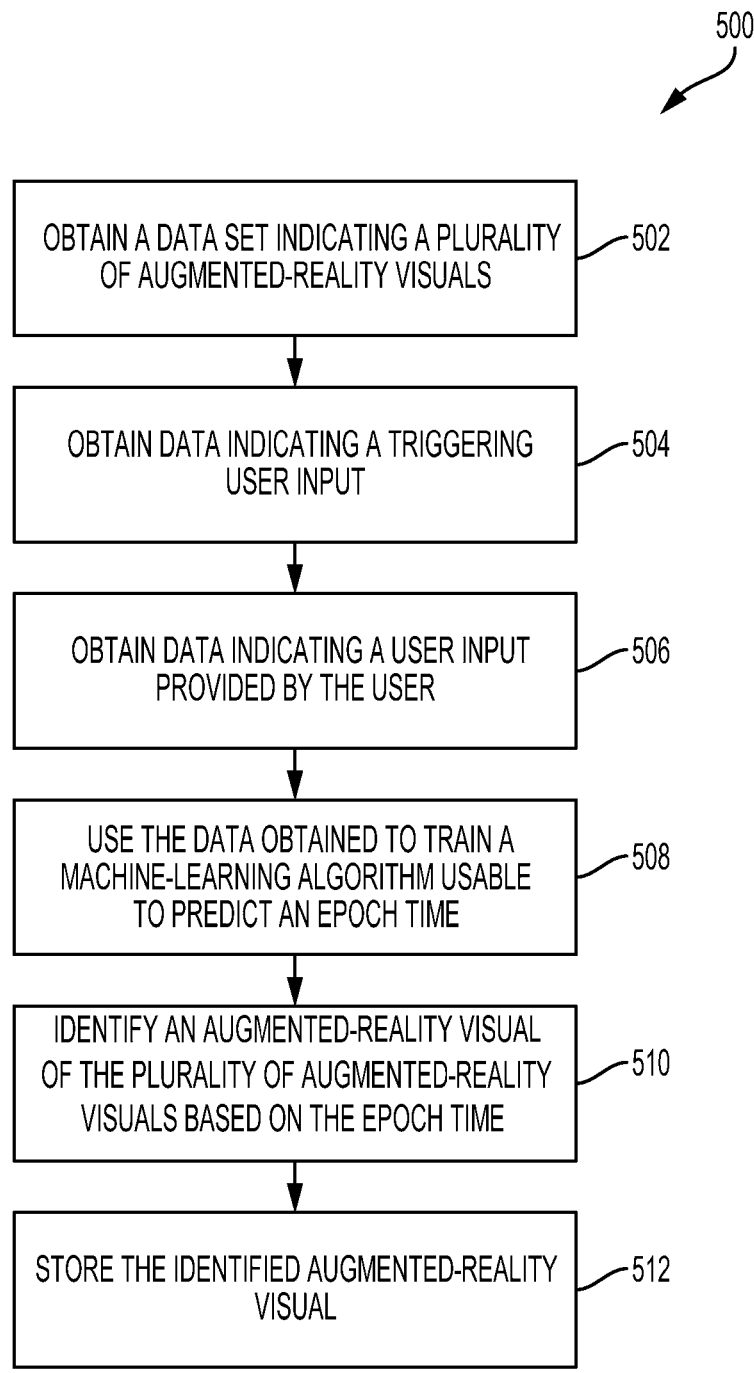
FIG. 5 is a flow chart depicting an example of a process for identifying an augmented-reality visual based on an epoch time, according to certain embodiments.

For example, FIG. 5 is a flow chart depicting an example of a process 500 for identifying an augmented-reality visual based on an epoch time. In some embodiments, one or more processing devices such as, for example, the computing system described herein with respect to FIG. 6, implement operations depicted in FIG. 5 by executing suitable program code (e.g., the augmented-reality visual identification system 102 of FIG. 1) that implements one or more algorithms encompassed by the process 500. For illustrative purposes, the process 500 is described with reference to the examples depicted in FIG. 1, but other implementations are possible.

In block 502, a data set indicating various AR visuals. In some embodiments, one or more processing devices execute an identification engine 140 to obtain the data set, which includes augmented-reality content data 136. For example, the identification engine 140 obtains or receives the data set from one or more computing devices 104, a data storage unit 112, an augmented-reality engine 128, user input (e.g., if a user programs the identification engine 140 to include the data set), or any other source. In some embodiments, the identification engine 140 obtains the data set in substantially the same manner as described above with respect to block 202 of FIG. 2.

The data set obtained at block 502 includes data about an AR or v-commerce environment generated and provided by an augmented-reality engine 128. The data indicates one or more AR visuals generated by the augmented-reality engine 128 and provided to a user (e.g., the AR visual 302 of FIG. 3 or the AR visual 400 of FIG. 4). For example, the data set includes data about the AR visual generated, a physical space in the AR visual, a physical object in the AR visual (e.g., physical objects 304, 306, 308 of FIGS. 3-4), a virtual object in the AR visual (e.g., virtual object 402 of FIG. 4), a time that the AR visual is generated and provided to the user, a time that the augmented-reality engine 128 stops providing the AR visual to the user, a duration of time that the AR visual is provided to the user, a duration of an AR or v-commerce environment session that includes one or more AR visual (e.g., a length of time from the time a first AR visual is provided to the user to the time a last AR visual is provided to the user), etc.

In block 504, data indicating a triggering user input is obtained. In some embodiments, one or more processing devices execute the identification engine 140 to obtain the data. For example, the identification engine 140 obtains or receives the data from one or more computing devices 104, a data storage unit 112, an augmented-reality engine 128, user input (e.g., if a user programs the identification engine 140 to include the data), or any other source. In some embodiments, the identification engine 140 obtains data indicating a triggering user input in substantially the same manner as described above with respect to block 204 of FIG. 2.

In block 506, data indicating a user input provided by the user is obtained. In some embodiments, one or more processing devices execute the identification engine 140 to obtain the data, which includes user input data 138. For example, the identification engine 140 obtains or receives the data from one or more computing devices 104, a data storage unit 112, an augmented-reality engine 128, user input (e.g., if a user programs the identification engine 140 to include the data), or any other source. In some embodiments, the identification engine 140 obtains the data about the user input in substantially the same manner as described above with respect to block 206 of FIG. 2.

In some embodiments, the data set obtained at block 506 includes data about user input provided by one or more users of the augmented-reality visual identification system 102 or computing device 104. The data indicates one or more user inputs provided by the user as the user views, or interacts with, augmented reality visuals (e.g., user input provided by the user using virtual icons 310a-f of FIG. 3 or virtual icons 406a-h of FIG. 4). For example, the data includes data indicating a time that the user provides the user input, a type of user input (e.g., interaction with a virtual object, manipulation of the virtual object, selection of a particular virtual icon 310a-f of FIG. 3 or virtual icon 406a-h of FIG. 4 or other virtual user interface), or any other data associated with user input provided by the user.

In block 508, the data obtained (e.g., the data obtained in block 502, 504, or 506) is used to train a machine-learning algorithm that is used to predict an epoch time. In some embodiments, one or more processing devices execute a machine-learning algorithm engine 142 to train one or more machine-learning algorithms based on the data obtained by the identification engine 140. In some embodiments, the machine-learning algorithm engine 142 trains the machine-learning algorithm to learn to accurately predict an epoch time based on the data obtained. An example of a machine-learning algorithm includes a neural network or any other suitable machine-learning algorithm.

For example, the machine-learning algorithm engine 142 receives data about a v-commerce environment generated and provided to one or more users (e.g., the v-commerce environment 300 of FIG. 3), data indicating a predefined triggering user input (e.g., data obtained in block 504), and data indicating one or more user inputs provided by the various users while viewing the v-commerce environment (e.g., data obtained in block 506). The data indicates, for example, an amount of time a user spends viewing a v-commerce environment before providing a user input that corresponds to a triggering user input (e.g., an amount of time the user spent viewing the v-commerce environment before providing user input requesting information about a real world physical object represented by a virtual object or before providing user input to purchase the real world physical object), a number of times a virtual object is selected by the user in the v-commerce environment (e.g., a number of times a user provides user input to select the virtual object 402 of FIG. 4 or a number of times the user provides user input to select virtual icon 406*c* to generate one or more additional virtual objects), a number of times a virtual object is generated or provided to the user in the v-commerce environment, a number of virtual objects generated or provided to the user in the v-commerce environment, an amount of time the user viewed a particular virtual object, a duration of the v-commerce environment session (e.g., an amount of time between generating and providing a first AR visual and generating and providing a last AR visual in the v-commerce environment), a time interval between AR visuals or between any user interaction with the v-commerce environment, or any other data about the v-commerce environment or a user's interaction with the v-commerce environment.

In some embodiments, the machine-learning algorithm engine 142 uses the data obtained (e.g., the data obtained in block 502, 504, or 506) to generate one or more data points. Each data point represents a covariate (e.g., a variable) that may be used by the machine-learning algorithm engine 142 to train a machine-learning algorithm to predict the epoch time. The machine-learning algorithm engine 142 then groups the data points based on a similarity between the covariate represented by the data point (e.g., data points indicating an amount of time a user views a v-commerce environment before providing a user input that corresponds to a triggering user input are grouped together) or based on the data points satisfying a predetermined condition (e.g., based on data indicating that the duration of the v-commerce session for various users was greater than thirty seconds or any other suitable time period).

The machine-learning algorithm engine 142 then trains the machine-learning algorithm to use the groups to determine a probability distribution of a particular epoch time (e.g., a probability distribution of a user providing user input corresponding to a triggering user input at or near a particular epoch time). In some embodiments, the probability distribution associated with each covariate is visually observed to determine if the probability distribution is positively skewed. In some embodiments, the machine-learning algorithm engine 142 also trains the machine-learning algorithm to calculate a sample skewness using the formula:

$$\text{Skewness} = \frac{\frac{1}{n}\Sigma_{i=1}^{n}(x_i - \bar{x})^2}{\left[\frac{1}{n-1}\Sigma_{i=1}^{n}(x_i - \bar{x})^2\right]^{\frac{3}{2}}}$$

In some embodiments, the machine-learning algorithm engine 142 estimates a generalized gamma distribution for each group using a maximum likelihood estimation to determine the probability distribution. As an example, the machine-learning algorithm engine 142 trains the machine-learning algorithm to define the generalized gamma distribution using the formula:

$$f(T_p \mid Z) = \frac{a/b^{ac}}{\tau(c)} T_p^{ac-1} e^{-\left(\frac{T_p}{b}\right)^a}$$

In the formula above, $T_p$ is either: i) an amount of time between a time that a first AR visual is generated and provided to a user in a v-commerce environment and a time that the user provides user input corresponding to a triggering user input; or ii) an epoch time (e.g., a time after a user beings to view a v-commerce environment at which the user is likely to provide a user input that corresponds to a triggering user input). p is the number of covariates, $Z_{i,b}$=the scale parameter, $Z_{i,c}$=k|$Z_i$, a and c are the shape parameters of the gamma distribution, and b is the scale parameter of the gamma distribution. In some embodiments, the machine-learning algorithm engine 142 then estimates a, b, and c, which are functions of the covariates, using the formula:

$$f(T_p \mid a(Z_i), b(Z_i), c(Z_i)) = \frac{a(Z_i)/b(Z_i)^{a(Z_i)c(Z_i)}}{\tau(c(Z_i))} T_p^{a(Z_i)c(Z_i)-1} e^{-\left(\frac{T_p}{b(Z_i)}\right)^{a(Z_i)}}$$

In some embodiments, the machine-learning algorithm engine 142 generates one or more data plots indicating a probability distribution determined by the machine-learning algorithm engine 142. The machine-learning algorithm engine 142 trains the machine-learning algorithm to analyze the determined probability distributions using various methods and techniques, such as, for example, using the Nelder-Mead method to determine a maximum or minimum likelihood estimation of various parameters of each probability distribution.

In some embodiments, the machine-learning algorithm engine 142 then uses the one or more determined probability distributions to predict an epoch time. For example, based on the probability distribution, the machine-learning algorithm engine 142 trains the machine-learning algorithm to predict a particular epoch time after a user begins to view a v-commerce environment at which the user is likely to provide a user input that corresponds to a triggering user input.

In block 510, an AR visual of the various AR visuals (e.g., the various AR visuals generated and provided at block 202) is identified based on the epoch time (e.g., the epoch time determined in block 508). In some embodiments, one or more processing devices execute the identification engine 140 to identify the AR visual based on the epoch time.

For example, the identification engine 140 determines or identifies an AR visual that is provided to a user or viewed by the user at or near the epoch time. As an example, the identification engine 140 identifies an AR visual that is viewed by the user at or near the epoch time (e.g., immediately before the determined epoch time). As another example, the identification engine 140 identifies an AR visual that is viewed by the user after the user has viewed a percentage of the various AR visuals provided to the user and viewed by the user prior to the epoch time.

In some embodiments, in block 510, the identification engine 140 identifies one or more AR visuals based on the epoch time as described above and identify a subset of the identified AR visuals based on other data. As an example, the identification engine 140 obtains accelerometer data indicating a speed or acceleration associated with each identified AR visual (e.g., a speed at which the computing device 104 or an augmented reality device of the augmented-reality engine 128 is moving when each AR visual is generated and provided to the user). The identification engine 140 then identifies a subset of AR visuals from the identified AR visuals based on the accelerometer data. As an example, the identification engine 140 obtains data indicating a threshold accelerometer value (e.g., a threshold value for the speed at which the computing device 104 is moving when an AR visual is generated and provided to the user). The identification engine 140 compares accelerometer data associated with each identified AR visual and the threshold accelerometer value. The identification engine 140 then removes, from the identified AR visuals, one or more AR visuals associated with accelerometer data above the threshold accelerometer value. The identification engine 140 also identifies a subset of one or more AR visuals associated with accelerometer data below the threshold accelerometer value). In this manner, the identification engine 140 identifies a particular AR visual or a subset of AR visuals that are more likely to be clear visuals (e.g., not blurred visuals) based on accelerometer data associated with the AR visuals.

In some embodiments, the AR visual identified in block 510 corresponds to an AR visual of the various AR visuals viewed by the user that is likely to influence the user's behavior in a v-commerce environment (e.g., the v-commerce environment 300 of FIGS. 3-4). For example, the AR visual identified in block 510 is the AR visual that is likely to influence the user to provide user input corresponding to the triggering user input (e.g., to provide user input requesting information about the real world physical object represented by the virtual object or to provide user input to purchase the real world physical object). Thus, in some embodiments, the AR visual identified in block 510 is used to improve recommendation of various actions to the user (e.g., to recommend, to the user, various additional virtual objects representing real world physical objects available for sale based on the physical space, the physical objects, or the virtual objects in the identified augmented-reality visual), which provides users with content with which the user is more likely to engage (e.g., by increasing a likelihood of a user interacting with a virtual object or making a purchase by providing or recommending visuals that are likely to influence user behavior). In another example, the AR visual identified in block 510 is used to segment the user (e.g., to identify, based on the physical space, the physical objects, or the virtual objects in the identified augmented-reality visual, user preferences and group users based on similar user preferences or to group users based on a similarity between identified augmented-reality visual associated with the users).

In block 512, the identified augmented-reality visual is stored. In some embodiments, one or more processing devices execute the identification engine 140 to transmit data indicating the identified augmented-reality visual (e.g., the augmented-reality visual identified in block 510) to one or more (e.g., the data storage unit 112), which stores data indicating the identified augmented-reality visual.

System Implementation Example

Figure 6:
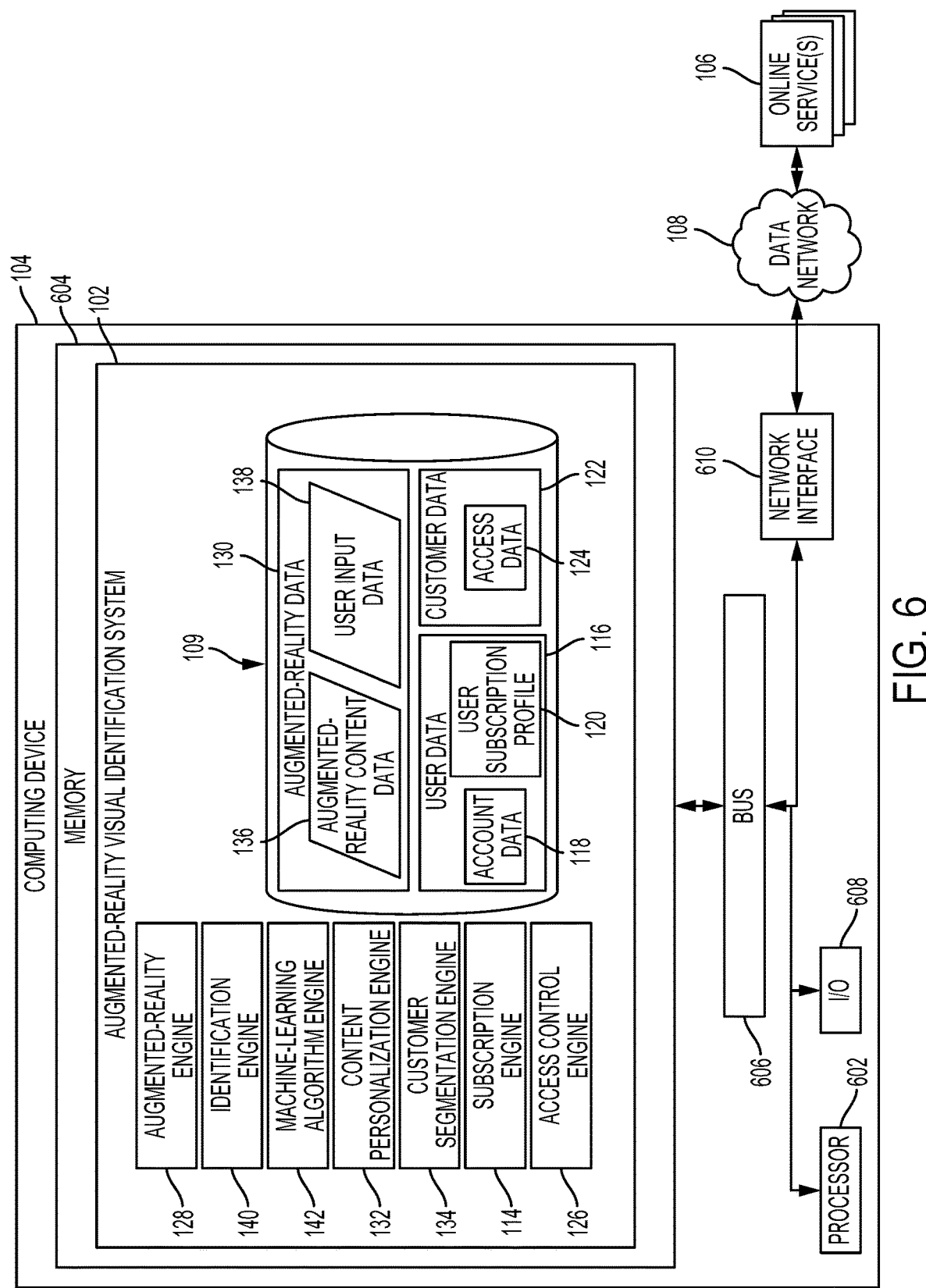
FIG. 6 is an example of a block diagram of a computing device that executes an augmented-reality visual identification system to identify augmented-reality visuals that influences user behavior in a virtual commerce environment, according to certain embodiments.

Any suitable computing system or group of computing systems can be used for performing the operations described herein. FIG. 6 is an example of a block diagram of a computing device 104 that executes an augmented-reality visual identification system 102 to perform the operations described herein.

The depicted example of the computing device 104 includes one or more processors 602 communicatively coupled to one or more memory devices 604. The processor 602 executes computer-executable program code stored in the memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including one or more processors 602 that are configured by program code to implement the operations described above, such as the operations depicted in FIG. 2 and FIG. 5 that are described with respect to processing devices.

The memory device 604 includes any suitable non-transitory computer-readable medium for storing the augmented-reality visual identification system 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript. One or more memory devices 604 are used to implement the operations described above, such as the operations depicted in FIG. 2 and FIG. 5 that are described with respect to one or more non-transitory computer-readable media.

The computing device 104 may also include a number of external or internal devices such as input or output devices. For example, the computing device 104 is shown with an input/output ("I/O") interface 608 that can receive input from input devices or provide output to output devices. A bus 606 can also be included in the computing device 104. The bus 606 can communicatively couple one or more components of the computing device 104. In some embodiments, the bus 606 is used to implement the operations described above with respect to FIG. 2 that involve communicating signals via a data bus.

The computing device 104 executes program code that configures the processor 602 to perform one or more of the operations described above with respect to FIGS. 1-5. The program code includes, for example, the augmented-reality engine 128, identification engine 140, machine-learning algorithm engine 142, content personalization engine 132, customer segmentation engine 134, subscription engine 114, access control engine 126 or other suitable applications that perform one or more operations described herein. The program code may be resident in the memory device 604 or any suitable computer-readable medium and may be executed by the processor 602 or any other suitable processor. In some embodiments, the program code described above is stored in the memory device 604, as depicted in FIG. 6. In additional or alternative embodiments, the program code described above is stored in one or more memory devices accessible via a data network.

The computing device 104 accesses the augmented reality data 130 in any suitable manner. In some embodiments, the augmented reality data 130 is stored in one or more memory devices accessible via a data network 108, as in the example depicted in FIG. 6. In additional or alternative embodiments, some or all of the augmented reality data 130 is stored in the memory device 604.

The computing device 104 depicted in FIG. 6 also includes at least one network interface 610. The network interface 610 includes any device or group of devices suitable for establishing a wired or wireless data connection to one or more data networks 108. Non-limiting examples of the network interface 610 include an Ethernet network adapter, a modem, or the like. The computing device 104 is able to communicate with one or more online services 106 using the network interface 610. In some embodiments, the network interface 610 is used to implement the operations described above with respect to FIG. 2 and FIG. 5 that involve communicating signals via a data network.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, or additions to the present subject matter as would be readily apparent to one of ordinary skill in the art.

What is claimed is:

1. A method for enhancing personalization of a virtual-commerce environment by identifying augmented-reality visual content of the virtual-commerce environment, the method comprising:
   obtaining, by a processor, data indicating a plurality of augmented-reality visuals generated in the virtual-commerce environment and provided for view by a user;
   obtaining, by the processor, data indicating a triggering user input, the triggering user input indicating a predetermined user input provideable by the user as the user views an augmented-reality visual of the plurality of augmented-reality visuals and detectable by the processor;
   obtaining, by the processor, data indicating a user input provided by the user to generate manipulated augmented-reality visuals from the plurality of augmented-reality visuals;
   predicting, by the processor, an epoch time by applying a machine-learning algorithm to the data indicating the user input, wherein the machine-learning algorithm is trained to predict epoch times during which users are likely to provide user inputs corresponding to the triggering user input;
   identifying, by the processor, a particular manipulated augmented-reality visual of the manipulated augmented-reality visuals that is viewed by the user at or nearest the epoch time; and
   storing the identified manipulated augmented-reality visual.

2. The method of claim 1, further comprising:
   identifying, by the processor and in response to determining a correspondence between the user input and the triggering user input, an additional particular augmented-reality visual provided to the user at a time associated with the user input.

3. The method of claim 2, wherein identifying the additional particular augmented-reality visual provided to the user at the time associated with the user input further comprises:
   obtaining, by the processor, a time stamp associated with each of the plurality of augmented-reality visuals;
   obtaining, by the processor, the time associated with the user input corresponding to the triggering user input; and
   identifying, by the processor, the additional particular augmented-reality visual provided to the user at the time the user provides the user input corresponding to the triggering user input based on a comparison of the time stamp associated with each of the plurality of augmented-reality visuals and the time associated with the user input corresponding to the triggering user input.

4. The method of claim 1, further comprising:
predicting the epoch time responsive to a determination of a lack of correspondence between the user input and the triggering user input.

5. The method of claim 1, further comprising training, by the processor, the machine-learning algorithm using the data indicating the plurality of augmented-reality visuals, the data indicating the triggering user input, and the data indicating the user input.

6. The method of claim 1, wherein the triggering user input indicates a request for information associated with a virtual object in a virtual-reality visual of the plurality of augmented-reality visuals.

7. The method of claim 1, further comprising:
identifying, by the processor, a group of augmented-reality visuals based on the user input and the triggering user input;
obtaining, by the processor, accelerometer data associated with each identified augmented-reality visual; and
identifying, by the processor, a subset of the identified group of augmented-reality visuals based on a comparison of the accelerometer data associated with each identified augmented-reality visual and a threshold accelerometer value.

8. A system comprising:
a processing device; and
a non-transitory computer-readable medium communicatively coupled to the processing device, wherein the processing device is configured to perform operations comprising:
obtaining data indicating a plurality of augmented-reality visuals generated in a virtual-commerce environment and provided for view by a user;
obtaining data indicating a triggering user input, the triggering user input indicating a predetermined user input provideable by the user as the user views an augmented-reality visual of the plurality of augmented-reality visuals;
obtaining data indicating a user input provided by the user to generate manipulated augmented-reality visuals from the plurality of augmented-reality visuals;
predicting, by the processing device, an epoch time by applying a machine-learning algorithm to the data indicating the user input, wherein the machine-learning algorithm is trained to predict epoch times during which users are likely to provide user inputs corresponding to the triggering user input;
identifying a particular manipulated augmented-reality visual of the manipulated augmented-reality visuals that is viewed by the user at or nearest the epoch time; and
storing the identified manipulated augmented-reality visual.

9. The system of claim 8, wherein the processing device is further configured to perform operations comprising:
predicting the epoch time responsive to a determination of a lack of correspondence between the user input and the triggering user input.

10. The system of claim 8, wherein the processing device is further configured to perform operations comprising:
identifying, in response to determining a correspondence between the user input and the triggering user input, an additional particular augmented-reality visual.

11. The system of claim 10, wherein the processing device is further configured to identify the additional particular augmented-reality visual by identifying, in response to determining the correspondence, the additional particular augmented-reality visual provided to the user at a time associated with the user input.

12. The system of claim 11, wherein the processing device is further configured to identify the additional particular augmented-reality visual generated and provided to the user at the time associated with the user input by:
obtaining a time stamp associated with each of the plurality of augmented-reality visuals;
obtaining the time associated with the user input corresponding to the triggering user input; and
identifying, by the processing device, the additional particular augmented-reality visual provided to the user at the time the user provides the user input corresponding to the triggering user input based on a comparison of the time stamp associated with each of the plurality of augmented-reality visuals and the time associated with the user input corresponding to the triggering user input.

13. The system of claim 8, wherein the triggering user input corresponds to user input indicates a request for information associated with a virtual object in a virtual-reality visual of the plurality of augmented-reality visuals.

14. The system of claim 8, wherein the processing device is further configured to perform operations comprising:
identifying a group of augmented-reality visuals based on the user input and the triggering user input;
obtaining accelerometer data associated with each identified augmented-reality visual; and
identifying a subset of the identified group of augmented-reality visuals based on a comparison of accelerometer data associated with each identified augmented-reality visual and a threshold accelerometer value.

15. A non-transitory computer-readable medium storing program code executable by a processor for enhancing personalization of a virtual-commerce environment by identifying augmented-reality visual content of the virtual-commerce environment, the program code comprising:
program code for obtaining, by the processor, data indicating a plurality of augmented-reality visuals generated in the virtual-commerce environment and provided for view by a user;
program code for obtaining, by the processor, data indicating a triggering user input, the triggering user input indicating a predetermined user input provideable by the user as the user views an augmented-reality visual of the plurality of augmented-reality visuals;
program code for obtaining, by the processor, data indicating a user input provided by the user to generate manipulated augmented-reality visuals from the plurality of augmented-reality visuals;
program code for predicting, by the processor, an epoch time by applying a machine-learning algorithm to the data indicating the user input, wherein the machine-learning algorithm is trained to predict epoch times during which users are likely to provide user inputs corresponding to the triggering user input;
program code for identifying, by the processor, a particular manipulated augmented-reality visual of the manipulated augmented-reality visuals that is viewed by the user at or nearest the epoch time; and
program code for storing the identified manipulated augmented-reality visual.

16. The non-transitory computer-readable medium of claim 15, further comprising:
program code for identifying, by the processor and in response to determining correspondence between the user input and the triggering user input, an additional particular augmented-reality visual at a time associated with the user input.

17. The non-transitory computer-readable medium of claim 16, wherein identifying the additional particular augmented-reality visual based on the correspondence comprises:
   obtaining, by the processor, a time stamp associated with each of the plurality of augmented-reality visuals;
   obtaining, by the processor, the time associated with the user input corresponding to the triggering user input; and
   identifying, by the processor, the additional particular augmented-reality visual provided to the user at the time the user provides the user input corresponding to the triggering user input based on a comparison of the time stamp associated with each of the plurality of augmented-reality visuals and the time associated with the user input corresponding to the triggering user input.

18. The non-transitory computer-readable medium of claim 15, wherein the program code further comprises:
   program code for predicting, by the processor and in response to a determination of a lack of correspondence between the user input and the triggering user input, the epoch time indicating a particular time that the user is likely to provide additional user input corresponding to the triggering user input.

19. The non-transitory computer-readable medium of claim 15, wherein the program code further comprises program code for training, by the processor, the machine-learning algorithm using the data indicating the plurality of augmented-reality visuals, the data indicating the triggering user input, and the data indicating the user input.

20. The non-transitory computer-readable medium of claim 15, wherein the program code further comprises:
   program code for identifying, by the processor, a group of augmented-reality visuals based on the user input and the triggering user input;
   program code for obtaining, by the processor, accelerometer data associated with each identified augmented-reality visual; and
   program code for identifying, by the processor, a subset of the identified group of augmented-reality visuals based on a comparison of the accelerometer data associated with each identified augmented-reality visual and a threshold accelerometer value.

* * * * *